US006866012B2

(12) United States Patent
Hayase et al.

(10) Patent No.: US 6,866,012 B2
(45) Date of Patent: Mar. 15, 2005

(54) ELECTROMAGNETICALLY DRIVEN VALVE CONTROL APPARATUS AND ELECTROMAGNETICALLY DRIVEN VALVE CONTROL METHOD FOR INTERNAL COMBUSTION ENGINE

(75) Inventors: Yuichiro Hayase, Toyota (JP); Kenji Tsubone, Susono (JP); Akihiro Yanai, Anjo (JP); Yoshinori Kadowaki, Toyota (JP); Toshio Fuwa, Nissin (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/699,860

(22) Filed: Nov. 4, 2003

(65) Prior Publication Data

US 2004/0103867 A1 Jun. 3, 2004

(30) Foreign Application Priority Data

Nov. 28, 2002 (JP) ........................................ 2002-346229

(51) Int. Cl.$^7$ ................................................ F01L 9/04
(52) U.S. Cl. ................................. 123/90.11; 123/90.15; 251/129.1; 251/129.15; 251/129.16; 701/102; 701/105; 701/115
(58) Field of Search ................... 123/90.11; 251/129.01, 251/129.1, 129.15, 129.16; 701/101, 102, 103, 105, 115

(56) References Cited

U.S. PATENT DOCUMENTS

| | | | |
|---|---|---|---|
| 4,641,613 A | * | 2/1987 | Delesalle ............... 123/179.21 |
| 6,202,608 B1 | | 3/2001 | Yamaki et al. |
| 6,505,113 B2 | * | 1/2003 | Eichenseher et al. ....... 701/114 |
| 6,626,146 B1 | * | 9/2003 | Yanai et al. ................. 123/432 |
| 6,636,782 B2 | * | 10/2003 | Morikawa et al. .......... 700/282 |
| 2002/0011101 A1 | | 1/2002 | Hartke et al. |

FOREIGN PATENT DOCUMENTS

| | | |
|---|---|---|
| EP | 1 104 844 | 6/2001 |
| JP | A 9-189209 | 7/1997 |
| JP | A 2000-234534 | 8/2000 |
| JP | A 2001-207875 | 8/2001 |
| JP | A 2001-221022 | 8/2001 |

* cited by examiner

Primary Examiner—Thomas Denion
Assistant Examiner—Kyle M. Riddle
(74) Attorney, Agent, or Firm—Kenyon & Kenyon

(57) ABSTRACT

A main CPU determines whether or not there is a request for one valve driving based on an engine operating state such as an engine speed and a load factor, with reference to a control map. When it is determined that there is a request for one valve driving, it is determined whether or not there is an overlapping period between opening periods. When it is determined that there is no overlapping period, a high speed control is performed for controlling electromagnetically driven valves. When it is determined that there is no request for one valve driving, or when it is determined that there is the overlapping period, a low speed control is performed for controlling electromagnetically driven valves.

15 Claims, 16 Drawing Sheets

ELECTROMAGNETICALLY DRIVEN VALVE CONTROL APPARATUS AND ELECTROMAGNETICALLY DRIVEN VALVE CONTROL METHOD FOR INTERNAL COMBUSTION ENGINE

INCORPORATION BY REFERENCE

The disclosure of Japanese Patent Application No. 2002-346229 filed on Nov. 28, 2002, including the specification, drawings and abstract is incorporated herein by reference in its entirety.

BACKGROUND OF THE INVENTION

1. Field of the Invention

The invention relates to a technique for performing a driving control of an engine valve of an internal combustion engine using electromagnetic force.

2. Description of the Related Art

As a method for driving an intake valve and an exhaust valve which are engine valves of an internal combustion engine, an electromagnetically driving method in which the engine valves are driven using electromagnetic force is known. According to the electromagnetically driving method, opening/closing timing of the intake valve and the exhaust valve can be easily optimized in accordance with an operating state of the internal combustion engine (hereinafter, referred to simply as "engine operating state"), and combustion efficiency of the internal combustion engine can be improved. However, the electromagnetically driving method has not been widely used, and various techniques are proposed for putting the electromagnetically driving method to practical use.

For example, in order to reduce an operation noise which occurs when an electromagnetically driven valve is operated to be opened/closed, a technology is proposed, in which a value of current to be supplied to an electromagnet is calculated such that an actual speed of a movable portion becomes equal to a target speed, and energization of the electromagnet is controlled according to the calculated value of current (refer to Japanese Patent Laid-Open Publication No. 2000-234534, and Japanese Patent Laid-Open Publication No. 2001-221022). Also, another technology is proposed, in which valves are divided into valve groups such that each valve group includes valves whose opening periods do not overlap with each other, and a switching device is provided for each valve group so as to function as a driver for all the valves in each valve group (refer to Japanese Patent Laid-Open Publication No. 9-189209).

In order to reduce the operation noise, it is generally effective to shorten a control cycle of a processing unit such as a central processing unit (hereinafter, referred to simply as "a CPU") included in a controller (hereinafter, referred to simply as "an ECU") so that control for the electromagnetically driven valve is performed at a high speed, and the movable portion is smoothly seated when the electromagnetically driven valve is operated to be opened/closed. However, for example, an on-vehicle CPU which is easily available, and whose operating frequency is approximately several tens of megahertz to several hundred megahertz does not have an ability to perform different controls for plural electromagnetically driven valves in a satisfactorily meticulous manner. Therefore, it is conceivable to increase the number of CPUs. However, in the case of a design in which the number of CPUs is simply increased without considering optimization of the opening/closing timing, there is a problem in terms of cost.

SUMMARY OF THE INVENTION

It is an object of the invention to appropriately distribute processing power of processing units such as the CPUs, which control electromagnetically driven valves. It is another object of the invention to provide a technology for driving the electromagnetically driven valves, in which the electromagnetically driven valves are effectively controlled or operation noise is reduced while suppressing an increase in the number of the processing units.

A first aspect of the invention relates to an electromagnetically driven valve control apparatus for an internal combustion engine. The apparatus is used for a multi-cylinder internal combustion engine in which at least one of an intake valve and an exhaust valve that are provided in each of cylinders is configured as an electromagnetically driven valve that is driven using electromagnetic force. The apparatus includes a controller provided with processing units, each of which controls the electromagnetically driven valves in each of plural valve groups, each of the plural valve groups including the electromagnetically driven valves whose opening periods do not overlap with each other while the internal combustion engine is operated in a low speed low load region.

The phrase "the internal combustion engine is operated in a low speed low load region" signifies that the internal combustion engine is operated at a low speed or under a low load, or at a low speed and under a low load. It is desired that operation noise, which occurs when the electromagnetically driven valve is operated to be opened/closed, should be low in the low speed low load region. For example, the low speed low load region can be set according to characteristics of the internal combustion engine.

In order to reduce the operation noise, it is effect to shorten a control cycle of a processing unit such that a control for the electromagnetically driven valve is performed at a high speed. Accordingly, a control load of the processing unit is large during a period in which the electromagnetically driven valve is operated to be opened/closed (hereinafter, referred to simply as "an opening/closing operation period". In this regard, in the first aspect of the invention, the electromagnetically driven valves provided in the cylinders are divided into the plural valve groups, each of the plural valve groups including the electromagnetically driven valves whose opening periods do not overlap with each other while the internal combustion engine is operated in the low speed low load region. Therefore, while the internal combustion engine is operated in the low speed low load region, the opening/closing operations of the plural electromagnetically driven valves in each of the valve groups do not overlap with each other. Also, since the processing unit that controls the electromagnetically driven valves in each of the valve groups is provided for each of the valve groups, a control load of each processing unit can be dispersed. In other words, since the load is efficiently dispersed, the electronically driven valves can be effectively controlled, or the operation noise can be reduced while suppressing an increase in the number of the processing units.

A second aspect of the invention relates to an electromagnetically driven valve control method for an internal combustion engine. The method includes the steps of dividing the electromagnetically driven valves provided in cylinders into plural valve groups such that overlap of concentrated control periods for the electromagnetically driven valves in each of the valve groups is minimized, and controlling the electromagnetically driven valves in each of the valve groups using a single control body. An example of the concentrated control period is the opening/closing operation period. However, the concentrated control period is not limited to the opening/closing operation period, and may be any period as long as the control load is relatively large in the period.

The invention can be applied also to programs representing the configurations described above.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

Figure 1:
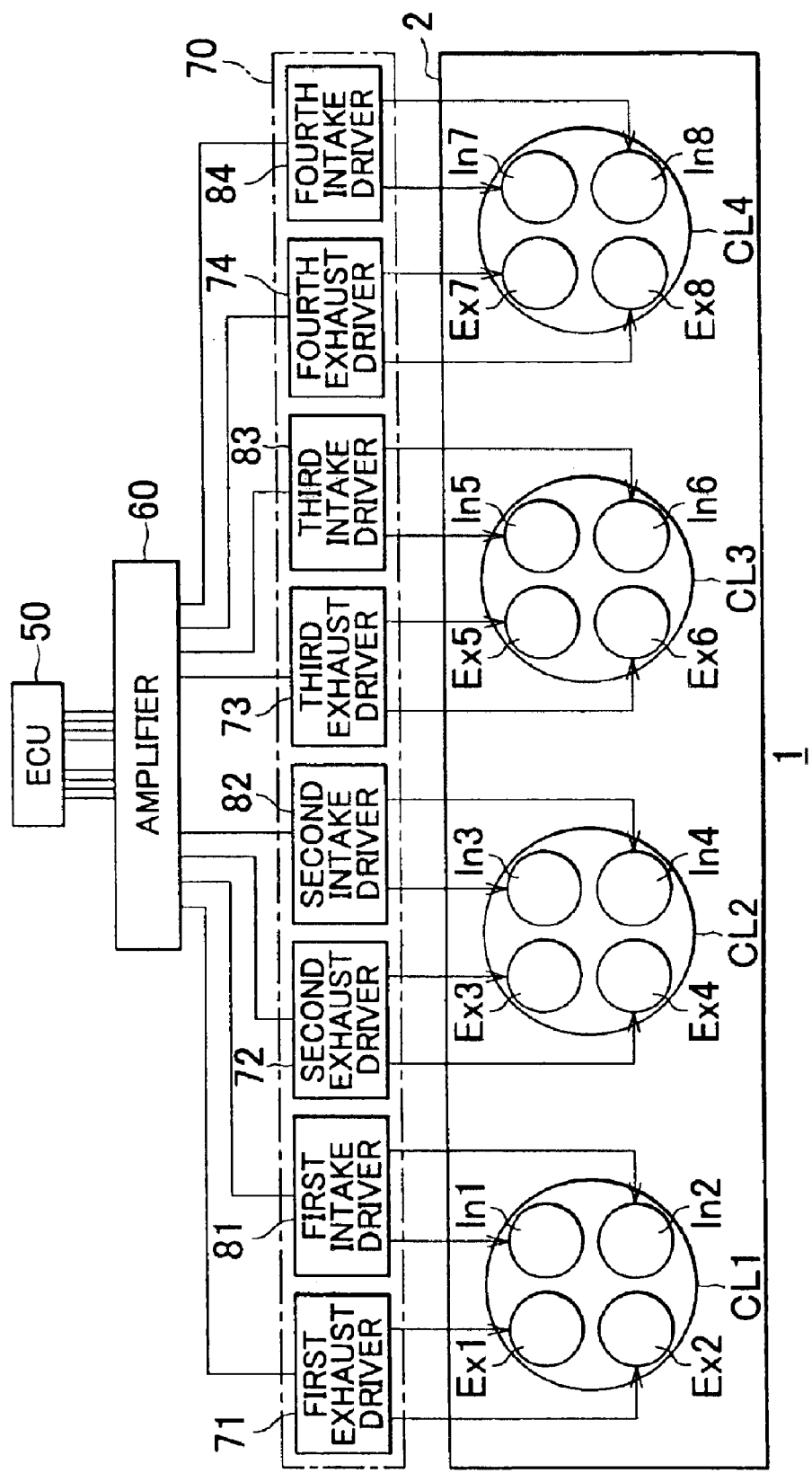
FIG. 1 is a diagram showing a configuration of an in-line four-cylinder internal combustion engine according to a first embodiment of the invention.

In an embodiment of the invention that will be described hereinafter, the invention is applied to a multi-cylinder internal combustion engine in which an intake valve and an exhaust valve provided in each of cylinders are configured as electromagnetically driven valves.

In the internal combustion engine, opening/closing timing of the intake valve and the exhaust valve provided in each of cylinders can be changed arbitrarily. Therefore, an ECU is provided for controlling opening/closing timing of each of the electromagnetically driven valves constituting the intake valve and the exhaust valve based on an engine operating state. That is, the ECU calculates, based on the engine operating state, the timing with which the intake valve and the exhaust valve provided in each of cylinders are opened/closed. When a crank angle of the internal combustion engine becomes equal to the calculated crank angle, a corresponding electromagnetically driven valve, which has been maintained at a closing position or an opening position, is operated to be opened/closed.

A holding current is supplied to the electromagnetically driven valve during a holding period in which the valve is held at the closing position or the opening position. Meanwhile, an attracting current for displacing a movable portion from one displacement end to the other displacement end is supplied to the electromagnetically driven valve during the opening/closing operation period, whereby the operation of the valve is controlled. In order to control the electromagnetically driven valve, the ECU calculates the holding current in a relatively long control cycle during the holding period. Also the ECU calculates the attracting current for making an actual speed of the movable portion of the electromagnetically driven valve equal to a target speed in a short control cycle during the opening/closing operation period. When the electromagnetically driven valve is operated to be opened/closed, the movable portion of the electromagnetically driven valve hits the displacement end, and operation noise occurs. In order to reduce the operation noise, it is effective to shorten the control cycle at this time such that the movable portion is smoothly seated, or to stop the movable portion immediately before seated. Therefore, the ECU calculates the attracting current in a short control cycle during the opening/closing operation period.

In the embodiment, the electromagnetically driven valves provided in the cylinders are divided into plural valve groups, each of which includes the electromagnetically driven valves whose opening periods do not overlap with each other while the internal combustion engine is operated in a low speed low load region. More particularly, the electromagnetically driven valves are divided into the plural valve groups such that each of the valve groups includes the electromagnetically driven valves in different cylinders, whose opening periods do not overlap with each other while the internal combustion engine is operated in the low speed low load region. If the opening/closing periods of the plural electromagnetically driven valves provided in different cylinders overlap with each other, the opening/closing operations of the electromagnetically driven valves overlap with each other. While the internal combustion engine is operated in the low speed low load region, it is desired to reduce the operation noise, which occurs when the electromagnetically driven valve is operated to be opened/closed, and therefore, the control cycle of the CPU needs to be shortened. Accordingly, a control load of the CPU during the opening/closing operation period is large. If the opening/closing periods of the plural electromagnetically driven valves provided in the different cylinders overlap with each other, the control load of the CPU during the opening/closing operation period becomes larger.

Thus, the ECU includes the CPUs, each of which controls the electromagnetically driven valves in each of the plural valve groups, whereby the control load of each CPU can be dispersed. In other words, since the load is efficiently dispersed, the electronically driven valves can be effectively controlled, or the operation noise can be reduced while suppressing an increase in the number of the processing units.

There is a case where the opening/closing operations of the plural electromagnetically driven valves in one valve group need to overlap with each other while the internal combustion engine is operated in the high speed high load operation, according to a control request for the electromagnetically driven valve. It is desirable that the opening/closing operations should not overlap with each other irrespective of the control request, in terms of reduction in the operation noise. However, priority may be given to the control request since a certain level of noise inevitably occurs while the internal combustion engine is operated in the high speed high load region. In this case, the control cycle of each CPU can be changed based on whether or not the opening/closing operations of the plural electromagnetically driven valves in each of the valve groups overlap with each other. In other words, when the opening/closing operation periods overlap with each other, there is a possibility that processing cannot be performed since the load is extremely large if the control cycle is unchanged. Therefore, the control cycle is made longer. As a result, though the control cannot be performed in a meticulous manner, a failure of the entire control can be avoided.

Also, in view of the above, in the internal combustion engine in which plural intake valves are provided in each of the cylinders, the electromagnetically driven valves provided in the cylinders may be divided into plural valve groups such that each of the plural valve groups includes the plural intake valves in the same cylinder. Also, in the internal combustion engine in which plural exhaust valves are provided in each of the cylinders, the electromagnetically driven valves may be divided into plural valve groups such that each of the plural valve groups includes the plural exhaust valves in the same cylinder. In this case, only one valve of the aforementioned plural valves in the same cylinder is operated to be opened/closed while the internal combustion engine is operated in the low speed low load region, whereby the opening/closing operations of the plural electromagnetically driven valves provided in the same cylinder do not overlap with each other, and the control load of each CPU can be dispersed. Further, in the internal combustion engine in which plural intake valves are provided in each of the cylinders when the electromagnetically driven valves are divided into plural valve groups such that each of the valve groups includes the plural intake valves in different cylinders, the number of the CPUs can be further reduced. Similarly, in the internal combustion engine in which plural exhaust valves are provided in each of the cylinders, when the electromagnetically driven valves are divided into plural valve groups such that each of the valve groups includes the plural exhaust valves in different cylinders, the number of the CPUs can be further reduced.

Hereinafter, each of a first embodiment to a third embodiment of the invention, which are examples of the aforementioned embodiment, will be described with reference to the accompanying drawings.

(First Embodiment)

FIG. 1 is a schematic diagram showing a configuration of an in-line four-cylinder internal combustion engine according to the first embodiment of the invention. The internal combustion engine 1 includes an engine body 2 including a first cylinder CL1 to a fourth cylinder CL4. Each of exhaust valves and intake valves is composed of an electromagnetically driven valve 200, which will be described with reference to FIG. 2. The operation of each of the electromagnetically driven valves is controlled by an ECU 50, an amplifier 60, and a valve driver 70. The ECU 50 is an electromagnetically driven valve control device. The amplifier 60 has a D/A conversion function and an amplification function. The valve driver 70 includes a first exhaust valve driver 71 to a fourth exhaust valve driver 74 and a first intake valve driver 81 to a fourth intake valve driver 84. The first exhaust valve driver 71 to the fourth exhaust valve driver 74 control an exhaust valve Ex1 to an exhaust valve Ex8 in a first cylinder CL1 to a fourth cylinder CL4. Similarly, the first intake valve driver 81 to the fourth intake valve driver 84 control an intake valve In1 to an intake valve In8 in a first cylinder CL1 to a fourth cylinder CL4. Each of the first exhaust valve driver 71 to the fourth exhaust valve driver 74 and the first intake valve driver 81 to the fourth intake valve driver 84 is composed of an ordinary H bridge circuit.

In the first cylinder CL1, the first exhaust valve Ex1 and the second exhaust valve Ex2, and the first intake valve In1 and the second intake valve In2 are provided. Similarly, in the second cylinder CL2, the third exhaust valve Ex3 and the fourth exhaust valve Ex4, and the third intake valve In3 and the fourth intake valve In4 are provided. In the third cylinder CL3, the fifth exhaust valve Ex5 and the sixth exhaust valve Ex6, and the fifth intake valve In5 and the sixth intake valve In6 are provided. In the fourth cylinder CL4, the seventh exhaust valve Ex7 and the eighth exhaust valve Ex8, and the seventh intake valve In7 and the eighth intake valve In8 are provided. Hereinafter, the exhaust valves will be collectively referred to simply as "the exhaust valve Ex" unless a specific exhaust valve needs to be distinguished from other exhaust valves. Similarly, the intake valves will be collectively referred to simply as "the intake valve In" unless a specific intake valve needs to be distinguished from other intake valves.

Figure 2:
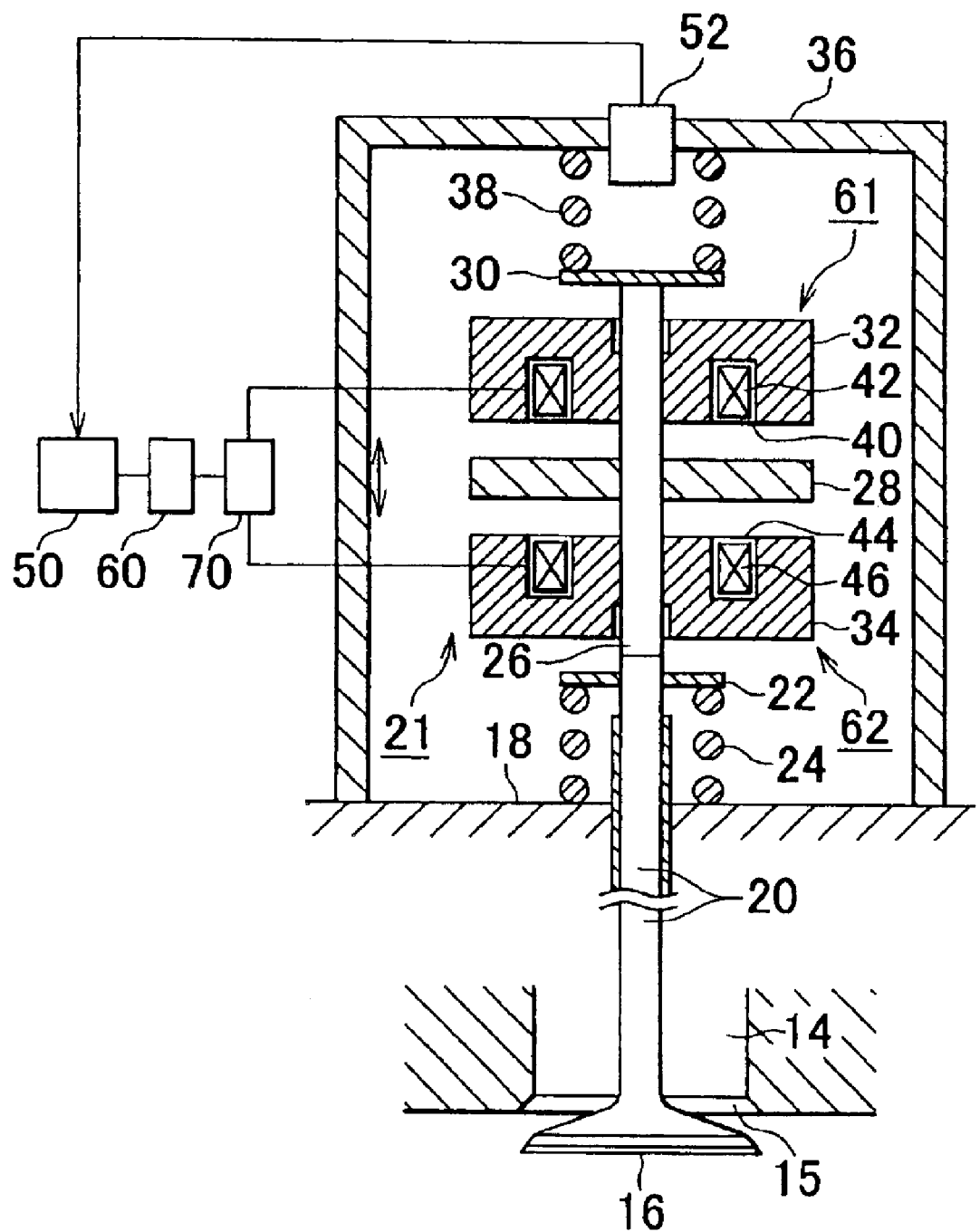
FIG. 2 is a diagram showing a configuration of an electromagnetically driven valve according to first to third embodiments of the invention.

FIG. 2 is a diagram showing a configuration of one electromagnetically driven valve 200. Each of the intake valve In and the exhaust valve Ex has this configuration, and is driven to be opened/closed using electromagnetic force of an electromagnet. The intake valve In and the Exhaust valve Ex are controlled according to the same control principle. Hereinafter, the intake valve In will be described.

The electromagnetically driven valve 200 includes a valve shaft 20, a valve element 16, and an electromagnetic drive portion 21. The valve shaft 20 is supported by a cylinder head 18 so as to be capable of reciprocating. The valve element 16 is provided at an end point of the valve shaft 20, which is shown in a lower portion of FIG. 2. The electromagnetic drive portion 21 drives the valve shaft 20. In the cylinder head 18, an intake port 14, which leads to a combustion chamber, is formed. A valve seat 15 is formed in the vicinity of an opening portion of the intake port 14. When the valve element 16 is seated on the valve seat 15, or is moved away from the valve seat 15 due to the reciprocation of the valve shaft 20 the intake oil 14 is closed or opened.

In the valve shaft 20, a lower retainer 22 is provided at an end portion which is opposite to the valve element 16. A lower spring 24 is provided in a compressed state between the lower retainer 22 and the cylinder head 18. The valve element 16 and the valve shaft 20 are urged in a closing direction, that is, upward in FIG. 2 due to elastic force.

The electromagnetic drive portion 21 includes an armature shaft 26 that is provided coaxially with the valve shaft 20. An armature 28 is fixed at a substantially center portion of the armature shaft 26. The armature 28 has a disc shape, and is made of material having high magnetic permeability. An upper retainer 30 is fixed at one end of the armature shaft 26. In the armature shaft 26, an end portion which is opposite to the end portion at which the upper retainer 30 is fixed contacts the end portion of the valve shaft 20 on the lower retainer 22 side.

In a casing 36 of the electromagnetic drive portion 21, an upper core 32 is fixed between the upper retainer 30 and the armature 28. Also, in the casing 36, a lower core 34 is fixed between the armature 28 and the lower retainer 22. Each of the upper core 32 and the lower core 34 is formed of material having high magnetic permeability so as to be annular. The armature shaft 26 penetrates a center portion of each of the upper core 32 and the lower core 34.

An upper spring 38 is provided in a compressed state between an upper surface of the casing 36 and the upper retainer 30. The armature shaft 26 is urged toward the valve shaft 20 side, that is, downward in FIG. 2 due to the elastic force of the upper spring 38. Further, the valve shaft 20 and the valve element 16 are urged in an opening direction, that is, downward in FIG. 2 by the armature shaft 26.

A displacement sensor 52 is attached at a top portion of the casing 36. The displacement sensor 52 outputs a voltage signal which varies according to a distance between the displacement sensor 52 and the upper retainer 30. A displacement of the armature shaft 26 or the valve shaft 20, that is, a displacement of the electromagnetically driven valve 200 is detected based on the voltage signal.

In the upper core 32, a first groove 40 is formed to be annular around a shaft center of the armature shaft 26 in a surface opposite to the armature 28. An upper coil 42 is provided in the first groove 40. The upper coil 42 and the upper core 32 constitute an upper portion electromagnet 61 for driving the intake valve In in a closing direction, that is, upward in FIG. 2.

Meanwhile, in the lower core 34, a second groove 44 is formed to be annular around the shaft center of the armature shaft 26 in a surface opposite to armature 28. A lower coil 46 is provided in the second groove 44. The lower coil 46 and the lower core 34 constitute a lower portion electromagnet 62 for driving the intake valve In in an opening direction, that is, downward in FIG. 2.

Energization of the upper coil 42 of the upper portion electromagnet 61 and the lower coil 46 of the lower portion electromagnet 62 is controlled by the ECU 50 which performs various controls for the internal combustion engine 1 in a centralized manner. The ECU 50 includes CPUs, a memory, an input circuit in which a detecting signal from the displacement sensor 52 is taken, and the like.

Figure 3:
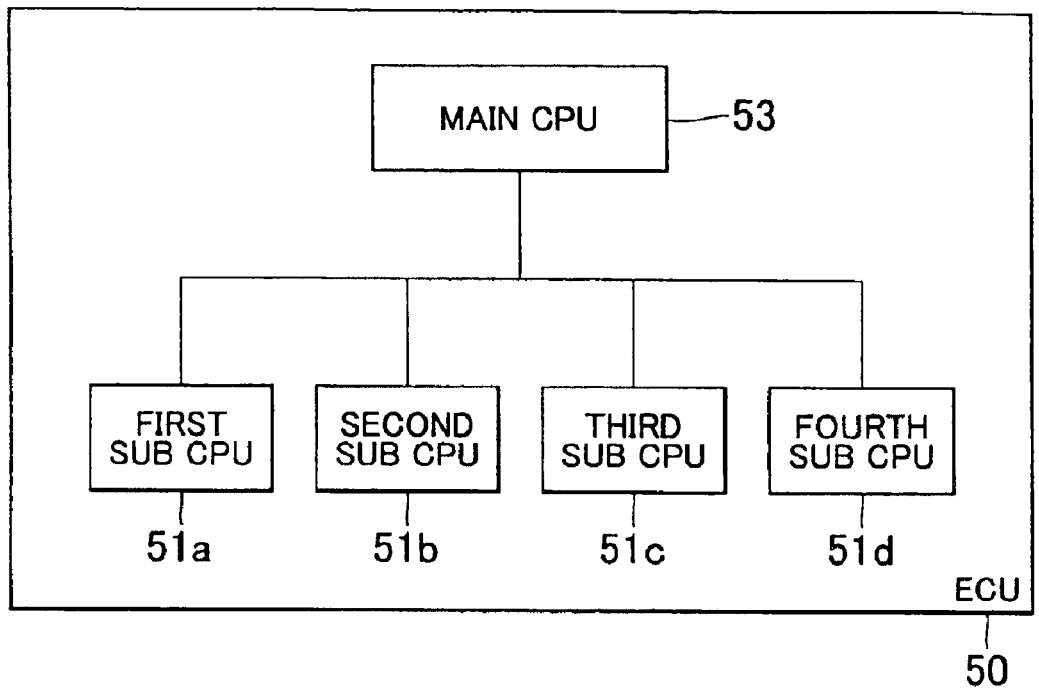
FIG. 3 is a block diagram showing a configuration of an ECU which controls the electromagnetically driven valves according to the first embodiment.

FIG. 3 is a block diagram of the ECU 50 that controls the electromagnetically driven valves 200 according to the embodiment. FIG. 3 shows only a configuration related to the embodiment. The ECU 50 includes a main CPU 53 and a first sub CPU 51a to a fourth sub CPU 51d. The main CPU 53 calculates opening/closing timing of the intake valve In and the exhaust valve Ex according to an engine operating state such as an engine speed and a load factor. The first sub CPU 51a to the fourth sub CPU 51d control the electromagnetically driven valves 200, which are divided into plural groups as described below. The sub CPUs are collectively referred to simply as "the sub CPU 51", unless a specific sub CPU needs to be distinguished from other sub CPUs.

The electromagnetically driven valves provided in the cylinders are divided into the plural valve groups. The sub CPU 51 controls each of the electromagnetically driven valves in each of the plural valve groups. In other words, in the embodiment, the first sub CPU 51a controls the first intake valve In1 and the second intake valve In2 in the first cylinder CL1, and the seventh intake valve In7 and the eighth intake valve In8 in the fourth cylinder CL4. Similarly, the second sub CPU 51b controls the third intake valve In3 and the fourth intake valve In4 in the second cylinder CL2, and the fifth intake valve In5 and the sixth intake valve In6 in the third cylinder CL3. Also, the third sub CPU 51c controls the first exhaust valve Ex1 and the second exhaust valve Ex2 in the first cylinder CL1, and the seventh exhaust valve Ex7 and the eighth exhaust valve Ex8 in the fourth cylinder CL4. The fourth sub CPU 51d controls the third exhaust valve Ex3 and the fourth exhaust valve Ex4 in the second cylinder CL2, and the fifth exhaust valve Ex5 and the sixth exhaust valve Ex6 in the third cylinder CL3.

Figure 4:
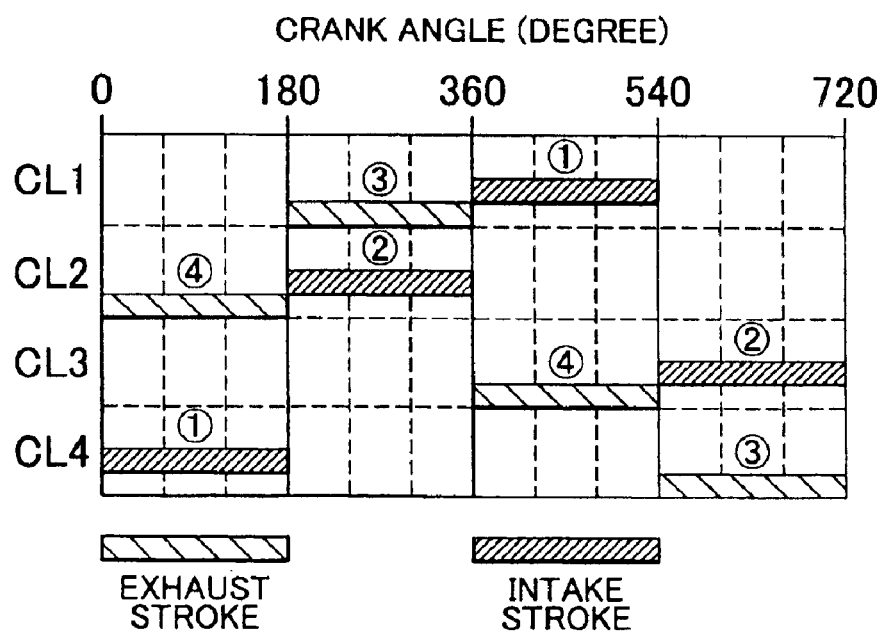
FIG. 4 is a diagram showing intake and exhaust strokes in one cycle of the internal combustion engine according to the first embodiment.

FIG. 4 shows intake strokes and exhaust strokes of the first cylinder CL1 to the fourth cylinder CL4 in one cycle, that is, during a period in which the crankshaft is rotated by 720 degrees. In FIG. 4, each of reference numerals 1 to 4 in circles indicates a number assigned to each sub CPU 51 which controls the electromagnetically driven valve that is opened during each of the strokes. Ignition is performed in the order of the first cylinder CL1, the third cylinder CL3, the fourth cylinder CL4, and the second cylinder CL2. The phases of the cylinders are shifted from each other by 180 degrees. Accordingly, the intake timing and the exhaust timing of the first cylinder CL1 are shifted from those of the second cylinder CL4 by 360 degrees. Similarly, the intake timing and the exhaust timing of the second cylinder CL2 are shifted from those of the third cylinder CL3 by 360 degrees. Basically, the first sub CPU 51a to the fourth sub CPU 51d perform the same control. Therefore, hereinafter, only the first sub CPU 51a will be described.

Figure 5:
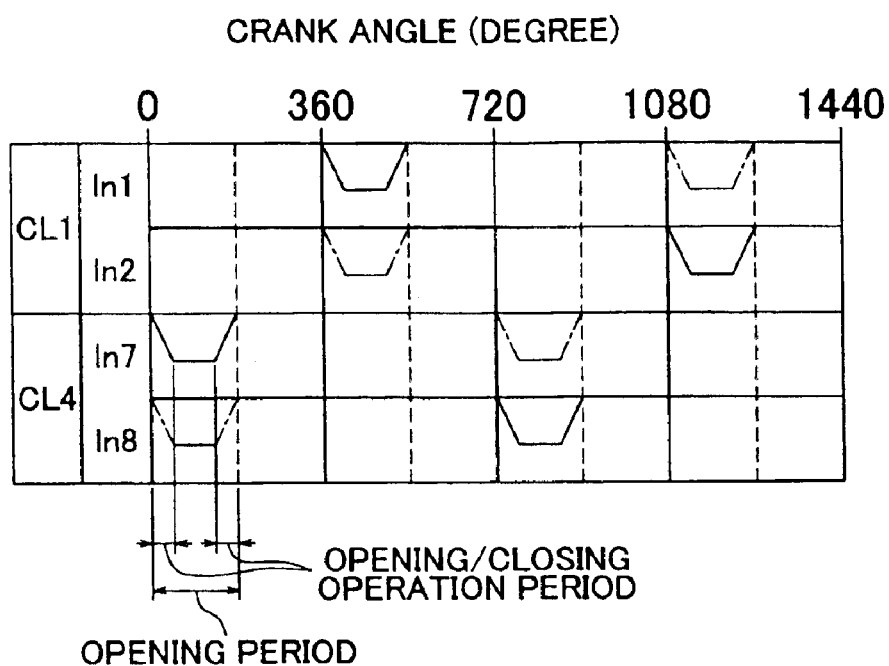
FIG. 5 is a diagram showing valve timing of an intake valve controlled by a first sub CPU during operation in a low speed low load region according to the first embodiment.

FIG. 5 shows valve timing of the intake valves In controlled by the first sub CPU 51a during operation in the low speed low load region. If the intake valves In in two cylinders which are adjacent to each other in the ignition order, for example, the first cylinder CL1 and the third cylinder CL3 were grouped into one valve group, the opening periods of the intake valve In provided in the first cylinder CL1 and the intake valve In provided in the third cylinder would overlap with each other, and accordingly, the opening/closing operation periods of the intake valves In would overlap with each other during the operation in the low speed low load region. However, as described above, the intake timing and the exhaust timing in the first cylinder are shifted from those of the fourth cylinder CL4 by 360 degrees in terms of the crank angle. Accordingly, the opening periods of the intake valve In provided in the first cylinder CL1 and the intake valve In provided in the fourth cylinder CL4 do not overlap with each other during operation in the low speed low load region, as long as "one valve driving", which will be described later, is performed. In other words, the opening/closing operation periods of the intake valve In in the first cylinder CL1 and the intake valve In in the fourth cylinder CL4 do not overlap with each other. Thus, the control load of the first sub CPU 51a can be reduced.

The two intake valves In provided in the same cylinder are operated to be opened/closed alternately. In other words, the intake valve In whose valve timing is indicated by a dashed line in FIG. 5 is not operated to be opened/closed. For example, the second intake valve In2 is not opened, and only the first intake valve In1 is opened during the intake timing from 360 degrees to 540 degrees in terms of crank angle. The first intake valve In1 is not opened, and only the second intake valve In2 is opened during next intake timing for the first cylinder CL1 from 1080 degrees to 1260 degrees in terms of crank angle. Hereinafter, the mode in which only one valve of the intake valves In in the same cylinder is operated to be opened/closed in the aforementioned manner will be referred to as "one valve driving". However, the intake valve In which is not operated to be opened/closed is maintained in an operable state considering fail safe even during the one valve driving. When the one valve driving is performed, a control for the intake valve In which is not operated to be opened/closed does not need to be meticulous, as long as the control is performed considering the aforementioned fail safe. Thus, a meticulous control is performed only for the intake valve In which is operated to be opened/closed, whereby an increase in the load of the sub CPU 51 is suppressed. In addition, a control performed during the holding period does not need to be meticulous, as long as the control is performed for maintaining the holding current as described above. Therefore, the control load for the intake valve In which is held at the closing position or the opening position is small.

Figure 6:
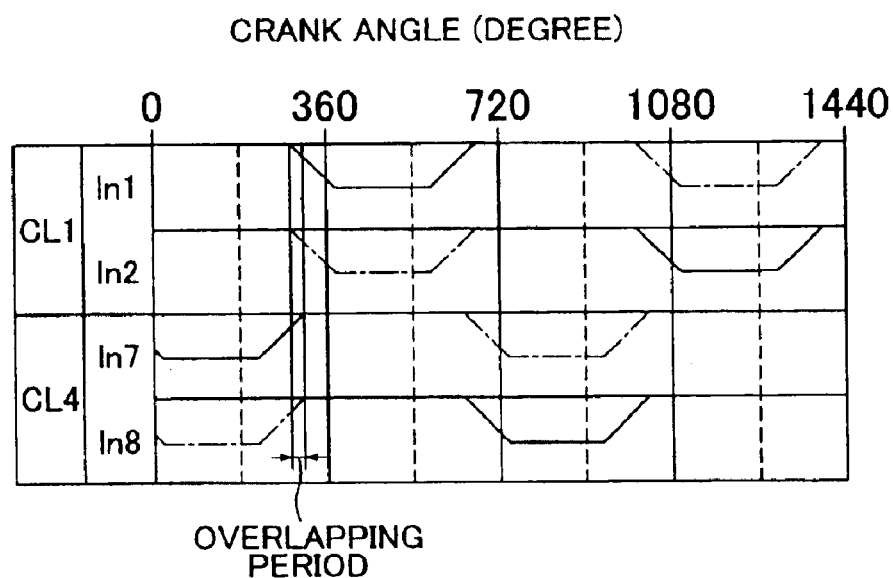
FIG. 6 is a diagram showing valve timing of the intake valve controlled by the first sub CPU during operation in a high speed high load region according to the first embodiment.

FIG. 6 shows an example of the valve timing during operation in the high speed high load region. In this example, the opening period of the intake valve In is long in terms of crank angle, as compared with the intake timing shown in FIG. 5. Therefore, the opening periods of the first intake valve In1 and the second intake valve In2 in the first cylinder CL1 partly overlap the opening periods of the seventh intake valve In7 and the eighth intake valve In8 in the fourth cylinder CL4. Accordingly, when the intake valves In in the two cylinders are to be opened/closed, the first sub CPU 51a causes the intake valves In to be opened/closed simultaneously. In this case, when the intake valves In are operated to be opened/closed, the control cycle of the first sub CPU 51a is made twice as long as the control cycle during the operation in the low speed low load region. For example, the control cycle is changed to be 60 (s if the control cycle during the operation in the low speed low load region is 30 (s. The control principle and a constant of an estimating device that are used for calculating the aforementioned attracting current are also changed, the moment when the control cycle is changed.

Figure 7:
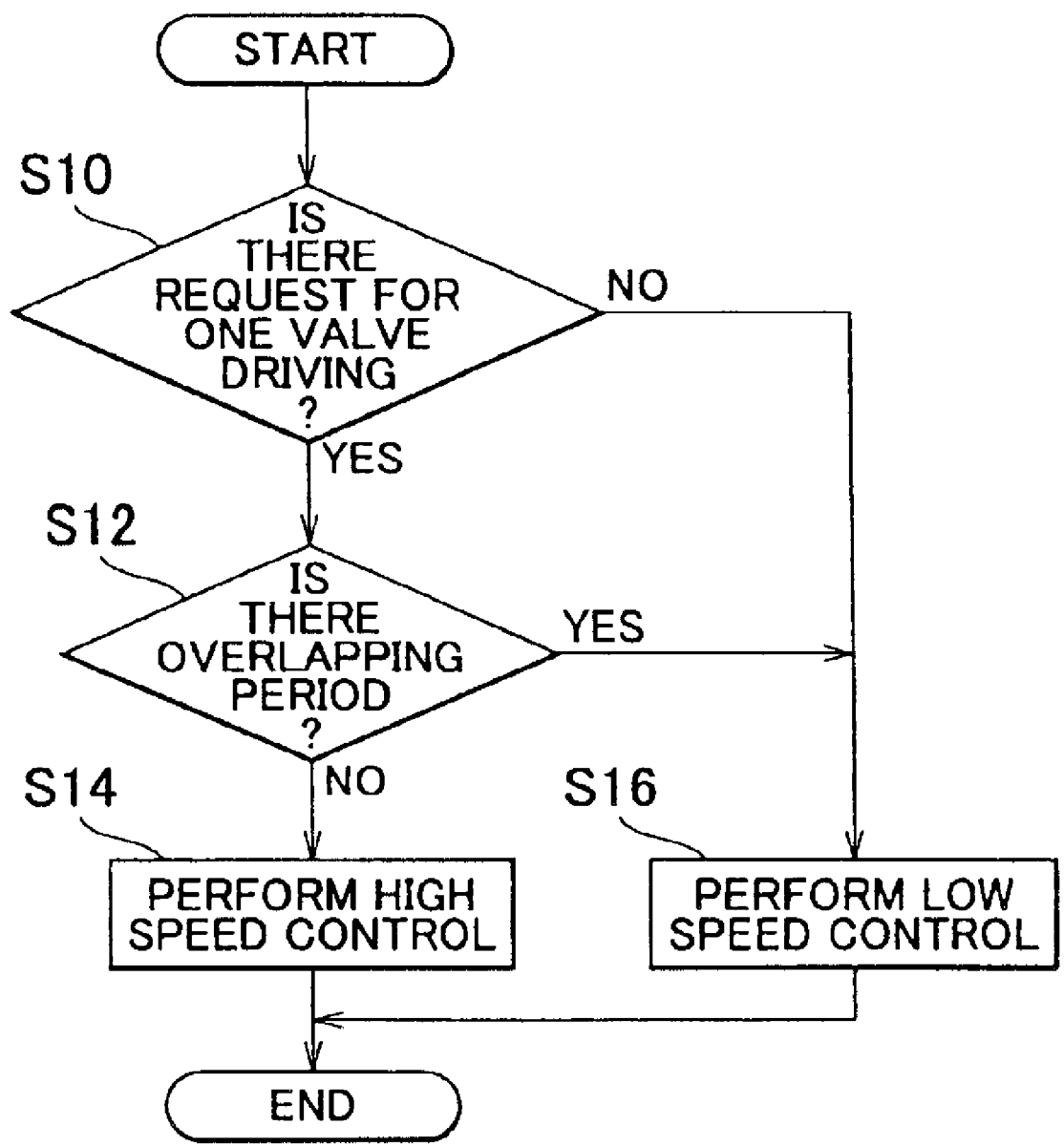
FIG. 7 is a flowchart showing a procedure for switching between a low speed control and a high speed control according to the first embodiment of the invention.

FIG. 7 is a flowchart showing a procedure for changing the control cycle. The main CPU 53 determines whether or not there is a request for one valve driving based on the engine operating state such as the engine speed and the load factor (S10), with reference to, for example, a control map shown in FIG. 8.

Figure 8:
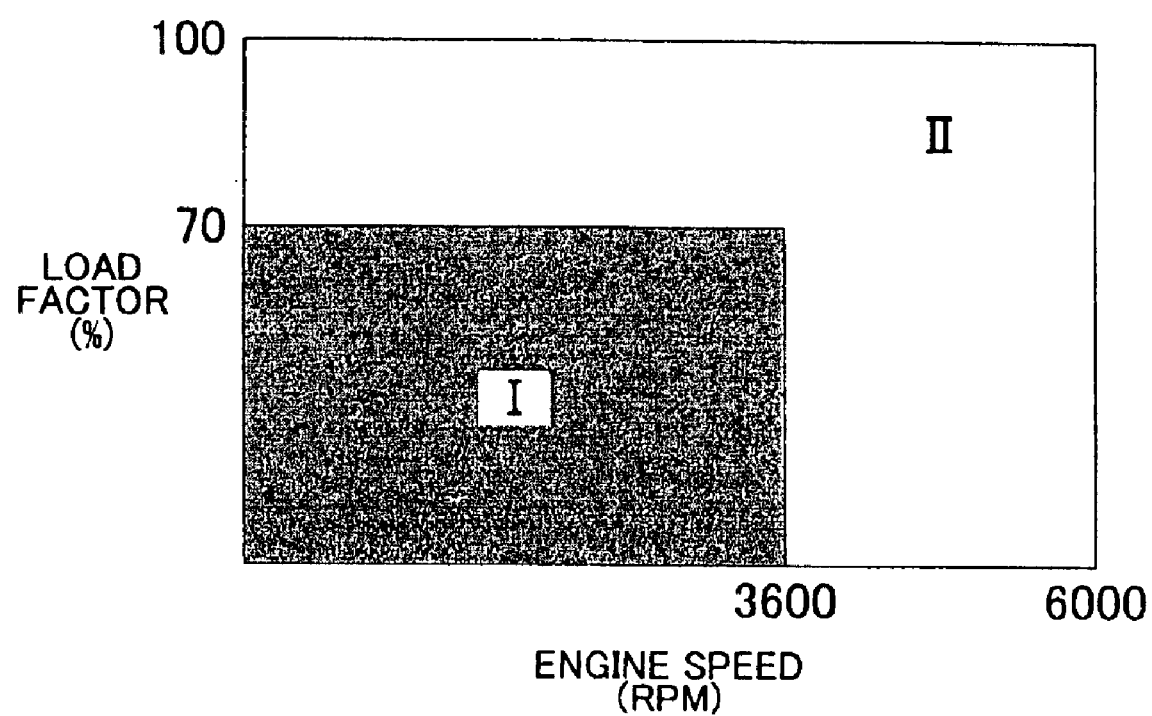
FIG. 8 is a diagram showing a control map which is referred to when a control speed of the sub CPU is changed according to the first embodiment.

In FIG. 8, a first region I corresponds to an engine operating state in which the one valve driving is performed. The first region I satisfies a condition 1 that an upper limit of the load factor is 70%, and a condition 2 that an upper limit of the engine speed is 3600 rpm. When the engine operating state is in the first region I, the sub CPU 51 performs a high speed control whose control cycle is short (hereinafter, referred to simply as "a high speed control". On the other hand, a control whose control cycle is long will be referred to as "a low speed control") for controlling the valves. Meanwhile, the one valve driving is not performed, and both the two intake valves in the same cylinder are driven in a second region II other than the first region I. At this time, the low speed control is performed for controlling the valves. The first region I and the second region II are determined based on the characteristics of the internal combustion engine 1.

When it is determined that there is the request for one valve driving (i.e., an affirmative determination is made in S10), it is determined whether or not there is an overlapping period between the opening periods of the intake valves In in the different cylinders to be controlled by the sub CPU 51 (S12). When it is determined that there is no overlapping period (i.e., a negative determination is made in S12), the high speed control is performed for controlling the electromagnetically driven valves 200 (S14). When it is determined that there is no request for one valve driving (i.e., a negative determination is made in S10), or when it is determined that there is the overlapping period (i.e., an affirmative determination is made in S12) though there is the request for one valve driving, the low speed control is performed for controlling the electromagnetically driven valves 200 (S16).

Figure 9:
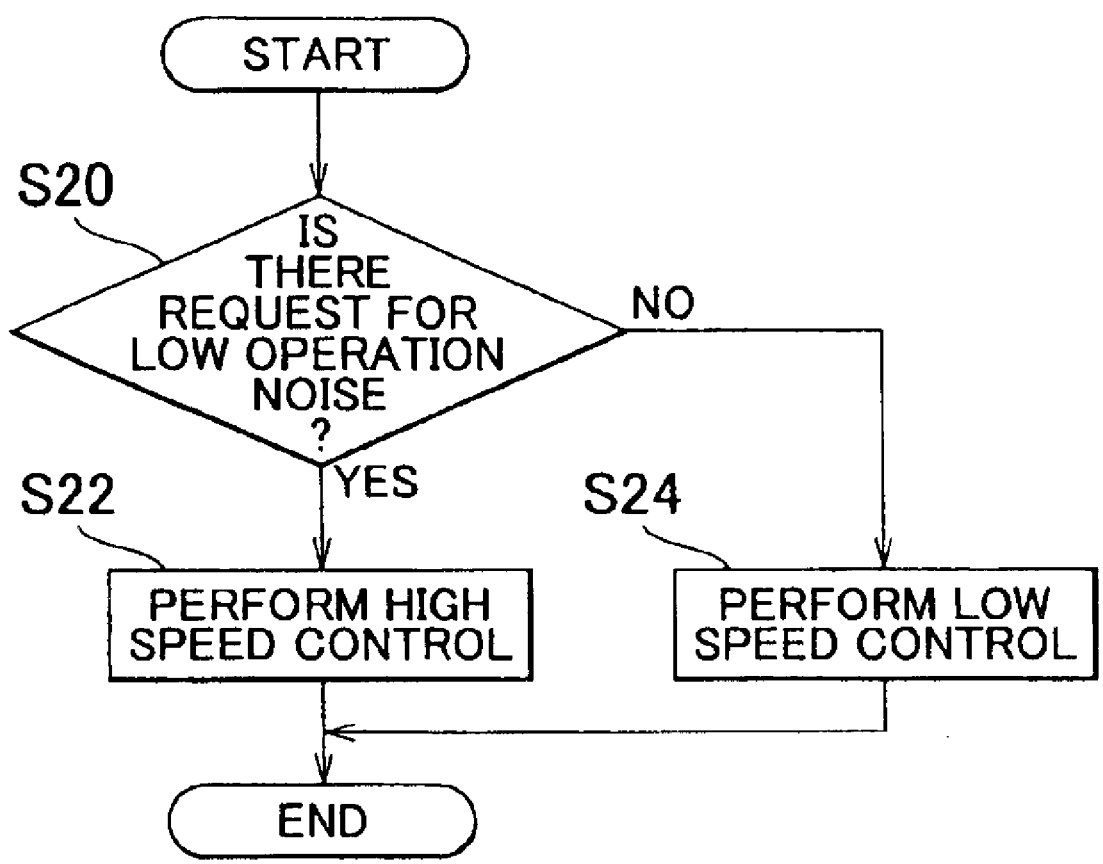
FIG. 9 is a flowchart showing a modified example of the procedure for switching between the low speed control and the high speed control according to the first embodiment.

FIG. 9 is a flowchart showing a modified example of the procedure for changing the control cycle. The main CPU 53 determines whether or not there is a request for low operation noise based on the engine operating state, with reference to a predetermined control map (S20). In general, the engine operating state in which there is the request for low operation noise is in a region in which an upper limit of the engine speed is low and an upper limit of the load factor is low as compared with the first region I shown in FIG. 8, for example a region in which the upper limit of the engine speed is 1500 rpm, and the upper limit of the load factor is 40%. When it is determined that there is the request for low operation noise (i.e., an affirmative determination is made in S20), the high speed control is performed for controlling the electromagnetically driven valves 200 (S22). When it is determined that there is no request for low operation noise (i.e., a negative determination is made in S20), the low speed control is performed for the electromagnetically driven valves 200 (S24).

Figure 10:
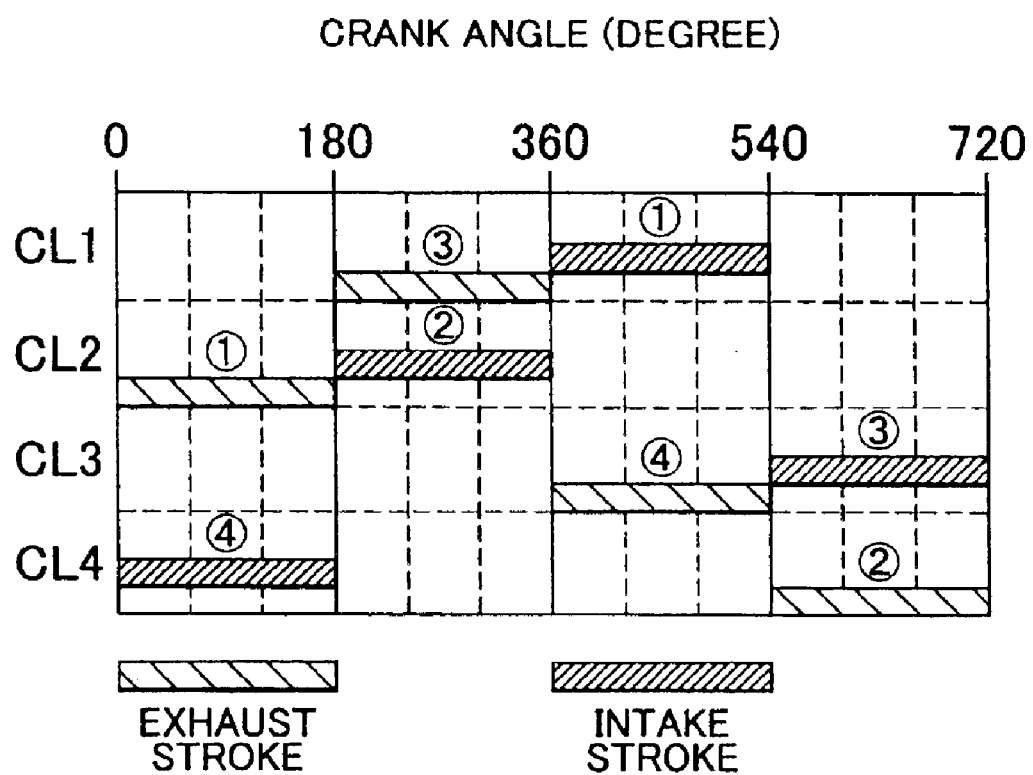
FIG. 10 is a diagram showing intake strokes and exhaust strokes of one cycle of the internal combustion engine according to the first embodiment of the invention.

In the aforementioned embodiment, when the electromagnetically driven valves 200 provided in the cylinders are divided into the plural valve groups, the intake valves In in the different cylinders are divided into the two valve groups, and the exhaust valves Ex in the different cylinders are divided into the two valve groups. Thus, the electromagnetically driven valves 200 are divided into the four groups in total. However, a manner in which the electromagnetically driven valves 200 provided in the cylinders are divided into the plural valve groups is not limited to the aforementioned manner. FIG. 10 shows a modified example in which the intake valves In and the exhaust valves Ex provided in different cylinders are grouped into the same valve group when the electromagnetically driven valves 200 provided in the cylinders are divided into the plural valve groups. In FIG. 10, each of reference numerals 1 to 4 in circles indicates a number assigned to each sub CPU 51 which controls the electromagnetically driven valve that is opened during each of intake strokes and exhaust strokes, as in FIG.

4. In other words, the first sub CPU 51a controls the first intake valve In1 and the second intake valve In2 in the first cylinder CL1, and the third exhaust valve Ex3 and the fourth exhaust valve Ex4 in the second cylinder CL2. The second sub CPU 51b controls the third intake valve In3 and the fourth intake valve In4 in the second cylinder CL2, and the seventh exhaust valve Ex7 and the eighth exhaust valve Ex8 in the fourth cylinder CL4. The third sub CPU 51c controls the first exhaust valve Ex1 and the second exhaust valve Ex2 in the first cylinder CL1, and the fifth intake valve In5 and the sixth intake valve In6 in the third cylinder CL3. The fourth sub CPU 5 Id controls the fifth exhaust valve Ex5 and the sixth exhaust valve Ex6 in the third cylinder CL3, and the seventh intake valve In7 and the eighth intake valve In8 in the fourth cylinder CL4. A procedure for switching between the low speed control and the high speed control is the same as that shown in the flowchart FIG. 7 or FIG. 9.

Figure 11:
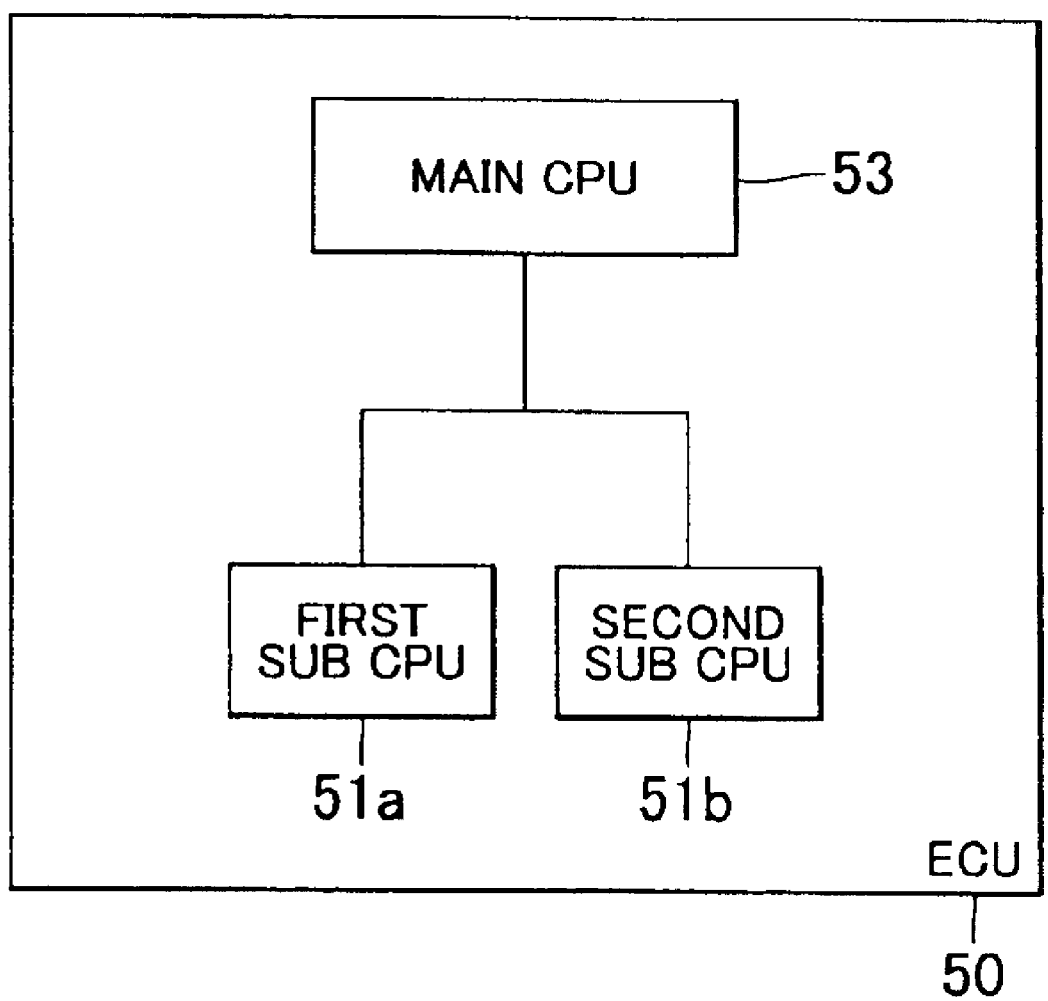
FIG. 11 is a diagram showing a configuration of an ECU including two sub CPUs according to the first embodiment.

When the opening periods of the intake valves In provided in different cylinders do not overlap with each other and the opening periods of the exhaust valves Ex provided in different cylinders do not overlap with each other while the internal combustion engine 1 is operated in the low speed low load region, the number of the sub CPUs 51 may be two. FIG. 11 shows a configuration of the ECU 50 including two sub CPUs 51. The ECU 50 includes the main CPU 53, the first sub CPU 51a, and the second sub CPU 51b. The first sub CPU 51a controls the first intake valve In1 to the eighth intake valve In8. The second sub CPU 51b controls the first exhaust valve Ex1 to the eighth exhaust valve Ex8. A procedure for switching between the low speed control and the high speed control is the same as that shown in the flowchart in FIG. 7 or FIG. 9.

(Second Embodiment)

Figure 12:
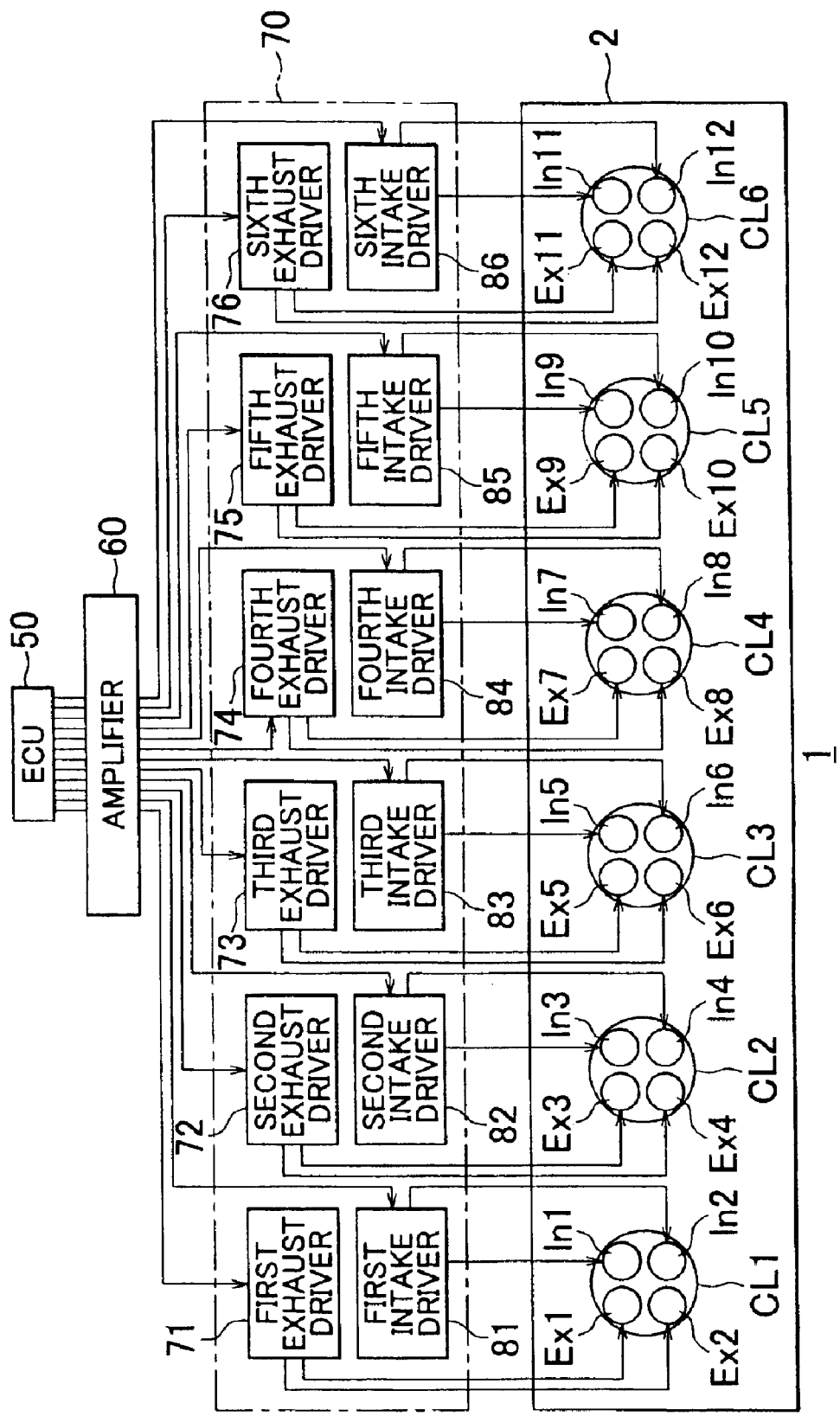
FIG. 12 is a diagram showing a configuration of an in-line six-cylinder internal combustion engine according to a second embodiment of the invention.

In the embodiment, the invention is applied to an in-line six-cylinder internal combustion engine 1. The configuration and the operation of the electromagnetically driven valve 200 is the same as in the first embodiment. FIG. 12 shows a configuration of the in-line six-cylinder internal combustion engine 1 which includes the first cylinder CL1 to the sixth cylinder CL6 according to the invention. Unlike the configuration shown in FIG. 1, an engine body 2 includes a fifth cylinder CL5 and a sixth cylinder CL6. In the fifth cylinder CL5, a ninth exhaust valve Ex9 and a tenth exhaust valve Ex10, and a ninth intake valve In9 and a tenth intake valve In10 are provided. In the sixth cylinder CL6, an eleventh exhaust valve Ex11 and a twelfth exhaust valve Ex12, and an eleventh intake valve In11 and a twelfth intake valve In12 are provided. The valve driver 70 includes a fifth exhaust driver 75, a fifth intake driver 85, a sixth exhaust driver 76, and a sixth intake driver 86. The fifth exhaust driver 75 and the fifth intake driver 85 control the exhaust valves Ex and the intake valves In in the fifth cylinder CL5, respectively. The sixth exhaust driver 76 and the sixth intake driver 86 control the exhaust valves Ex and the intake valves In in the sixth cylinder CL6.

Figure 13:
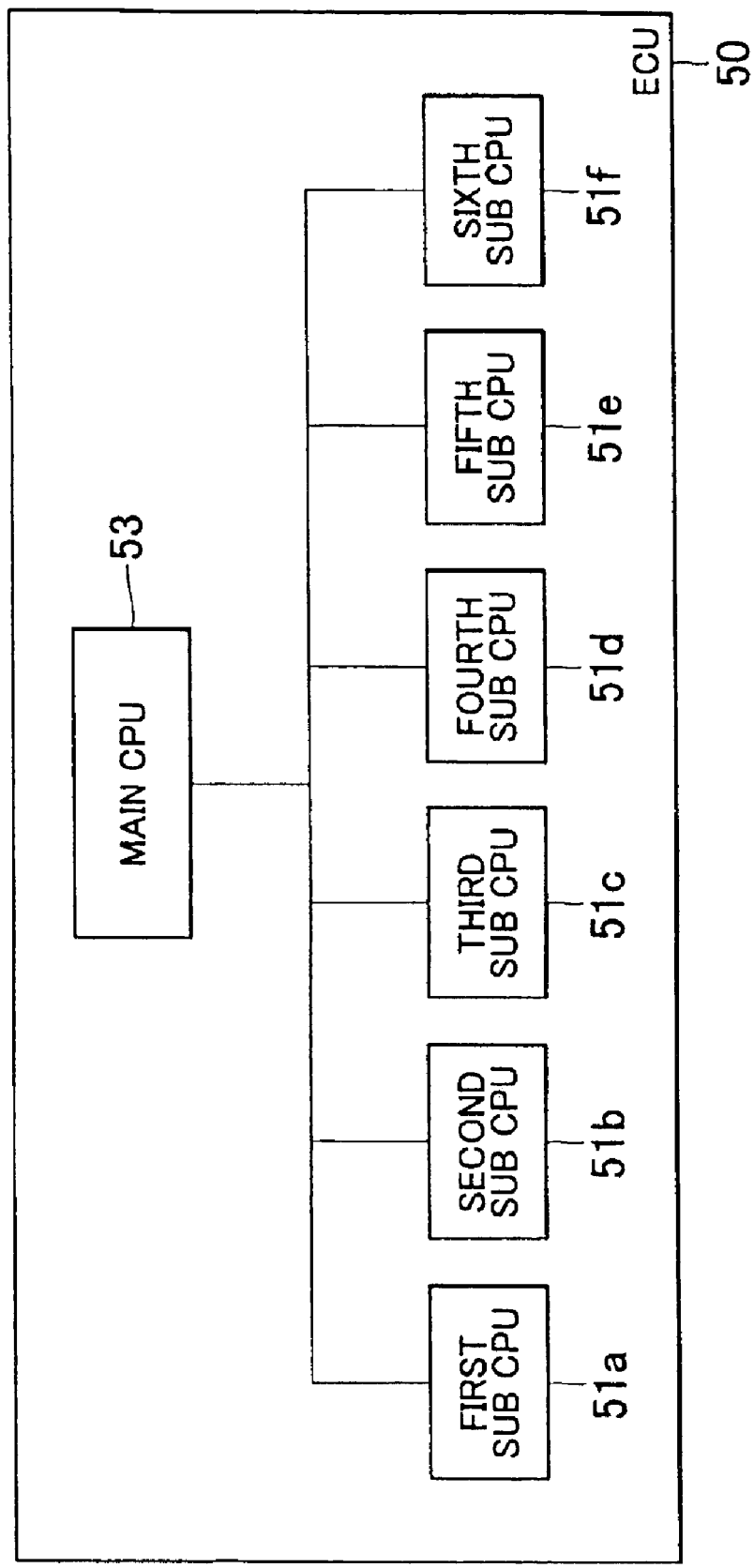
FIG. 13 is a block diagram schematically showing a configuration of an ECU which controls electromagnetically driven valves according to the second embodiment of the invention.

FIG. 13 is a block diagram schematically showing a configuration of the ECU 50 which controls the electromagnetically driven valves 200 according to the embodiment. Since the number of the electromagnetically driven valves 200 controlled by the ECU 50 is increased due to an increase in the number of the cylinders, the number of the sub CPUs 51 is increased from four to six. The first sub CPU 51a controls the first intake valve In1 and the second intake valve In2 in the first cylinder CL1, and the eleventh intake valve In11 and the twelfth intake valve In12 in the sixth cylinder CL6. Similarly, the second sub CPU 51b controls the third intake valve In3 and the fourth intake valve In4 in the second cylinder CL2, and the ninth intake valve In9 and the tenth intake valve In10 in the fifth cylinder CL5. The third sub CPU 51c controls the fifth intake valve In5 and the sixth intake valve In6 in the third cylinder CL3, and the seventh intake valve In7 and the eighth intake valve In8 in the fourth cylinder CL4.

Meanwhile, the fourth sub CPU 51d controls the first exhaust valve Ex1 and the second exhaust valve Ex2 in the first cylinder CL1, and the eleventh exhaust valve Ex11 land the twelfth exhaust valve Ex12 in the sixth cylinder CL6. The fifth sub CPU 51e controls the third exhaust valve Ex3 and the fourth exhaust valve Ex4 in the second cylinder CL2, and the ninth exhaust valve Ex9 and the tenth exhaust valve Ex10 in the fifth cylinder CL5. The sixth sub CPU 51f controls the fifth exhaust valve Ex5 and the sixth exhaust valve Ex6 in the third cylinder CL3, and the seventh exhaust valve Ex7 and the eighth exhaust valve Ex8 in the fourth cylinder CL4.

Figure 14:
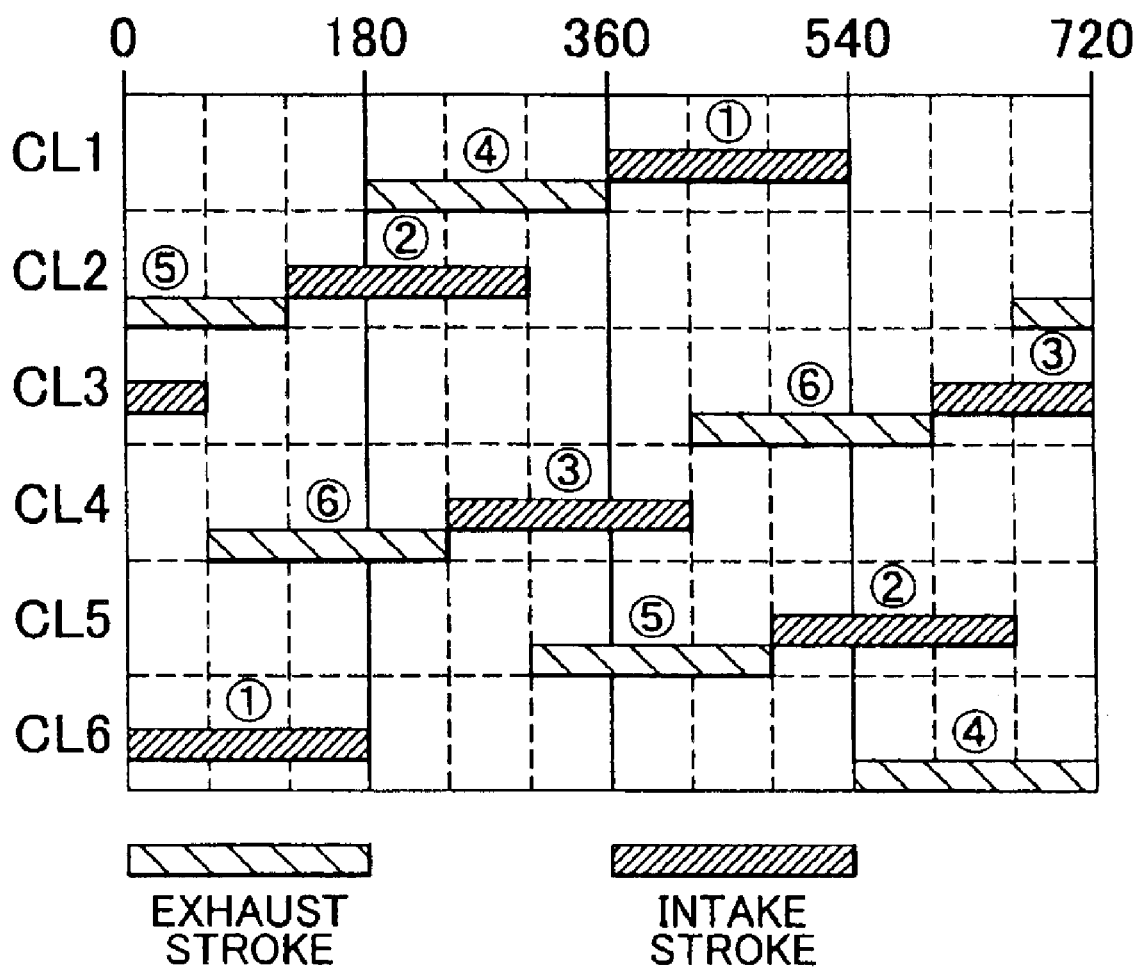
FIG. 14 is a diagram showing intake strokes and exhaust strokes of one cycle of the internal combustion engine according to the second embodiment of the invention.

FIG. 14 shows intake strokes and exhaust strokes of the in-line six-cylinder internal combustion engine 1. Each of reference numerals 1 to 6 in circles indicates a number assigned to each sub CPU 51 which controls the electromagnetically driven valve 200 that is opened during each of the intake strokes and the exhaust strokes, as in FIG. 4 and FIG. 10. Ignition is performed in the order of the first cylinder CL1, the fifth cylinder CL5, the third cylinder CL3, the sixth cylinder CL6, the second cylinder CL2, and the fourth cylinder CL4. The phases of the cylinders are shifted from each other by 120 degrees.

The exhaust timing phase of one of the two cylinders controlled by each sub CPU 51 is shifted from that of the other cylinder by 360 degrees in terms of crank angle. Similarly, the intake timing phase of one of the two cylinders controlled by each sub CPU 51 is shifted from that of the other cylinder by 360 degrees in terms of crank angle. Accordingly, for example, the opening period of the intake valve In provided in the first cylinder CL1 controlled by the first sub CPU 51a does not overlap the opening period of the intake valve In provided in the fourth cylinder CL4 controlled by the same first sub CPU 51a during the operation in the low speed low load region, as long as one valve driving is performed, as shown in the first embodiment. In other words, the opening/closing operation periods of these intake valves In do not overlap with each other. Therefore, the control load of the first sub CPU 51a can be reduced.

In the case where the intake timing and the exhaust timing of one of two cylinders controlled by each sub CPU 51 are shifted from those of the other cylinder by 240 degrees in terms of crank angle, when the opening periods of the intake valves In in two cylinders controlled by the same sub CPU 51 do not overlap with each other, and the opening periods of the exhaust valves Ex in two cylinders controlled by the same sub CPU 51 do not overlap with each other, the number of the sub CPUs 51 may be four. A configuration of the ECU 50 including four sub CPUs 51 is the same as that shown in FIG. 3. The first sub CPU 51a controls the first intake valve In1 and the second intake valve In2 in the first cylinder CL1, the third intake valve In3 and the fourth intake valve In4 in the second cylinder CL2, and the fifth intake valve In5 and the sixth intake valve In6 in the third cylinder CL3. Similarly, the second sub CPU 51b controls the seventh intake valve In7 and the eighth intake valve In8 in the fourth cylinder CL4, the ninth intake valve In9 and the tenth intake valve In10 in the fifth cylinder CL5, and the eleventh intake valve In11 and the twelfth intake valve In12 in the sixth cylinder CL6.

Figure 15:
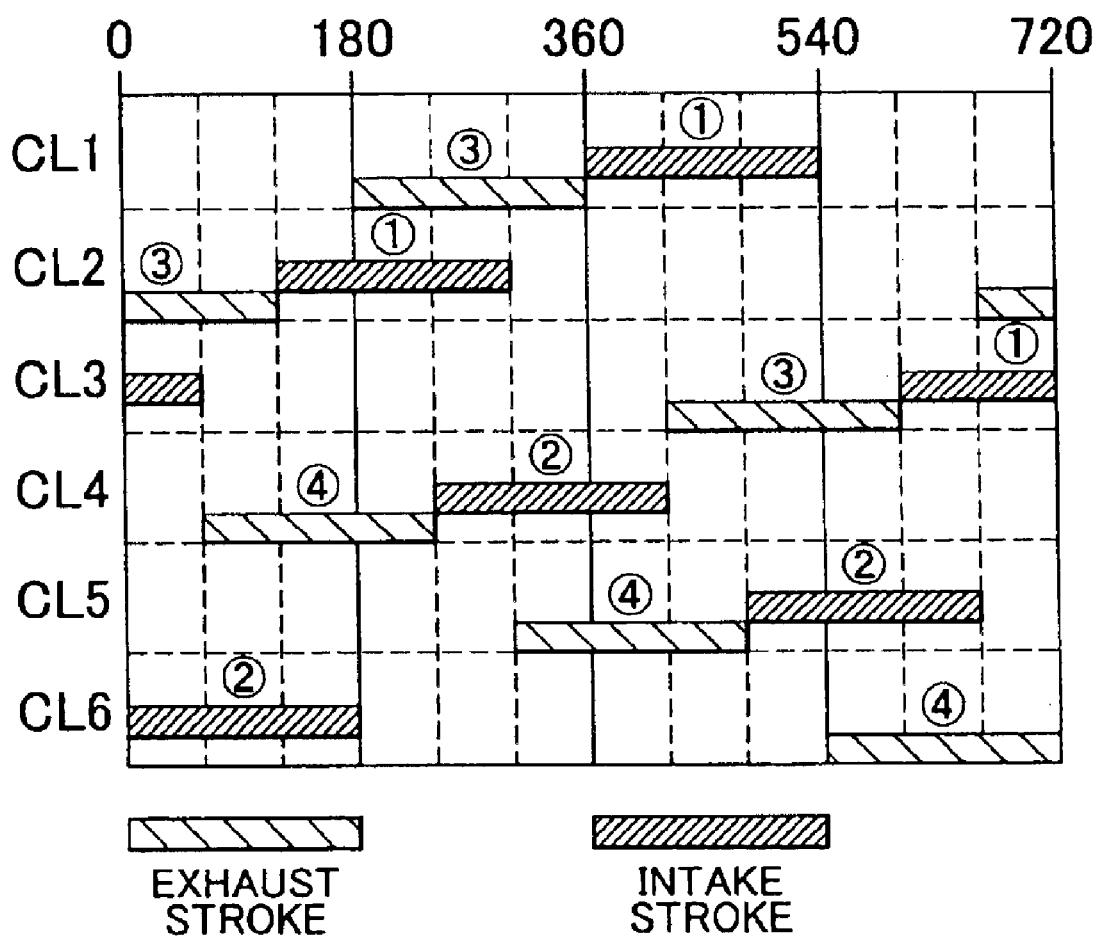
FIG. 15 is a diagram showing the intake strokes and exhaust strokes of one cycle of the internal combustion engine according to the second embodiment of the invention.

Meanwhile, the third sub CPU 51c controls the first exhaust valve Ex1 and the second exhaust valve Ex2 in the first cylinder CL1, the third exhaust valve Ex3 and the fourth exhaust valve Ex4 in the second cylinder CL2, and the fifth exhaust valve Ex5 and the sixth exhaust valve Ex6 in the third cylinder CL3. Similarly, the fourth sub CPU 51*d* controls the seventh exhaust valve Ex7 and the eighth exhaust valve Ex8 in the fourth cylinder CL4, the ninth exhaust valve Ex9 and the tenth exhaust valve Ex10 in the fifth cylinder CL5, and the eleventh exhaust valve Ex11 and the twelfth exhaust valve Ex12 in the sixth cylinder CL6. FIG. 15 shows intake strokes and exhaust strokes when the ECU 50 includes the four CPUs 51. Each of reference numerals 1 to 4 in circles indicates a number assigned to each sub CPU 51 which controls the electromagnetically driven valve 200 that is opened during each of the intake strokes and the exhaust strokes, as in FIG. 4, FIG. 10, and FIG. 14. The exhaust timing phases of three cylinders controlled by each CPU 51 are shifted from each other by 240 degrees in terms of crank angle. Similarly, the intake timing phases of the three cylinders controlled by each CPU 51 are shifted from each other by 240 degrees in terms of crank angle. Accordingly, for example, the opening periods of the intake valves In provided in the first cylinder CL1 to the third cylinder CL3 that are controlled by the first sub CPU 51*a* do not overlap with each other during the operation in the low speed low load region, as long as one valve driving is performed in this case as well. In other words, the opening/closing operation periods of these intake valves In do not overlap with each other.

(Third Embodiment)

Figure 16:
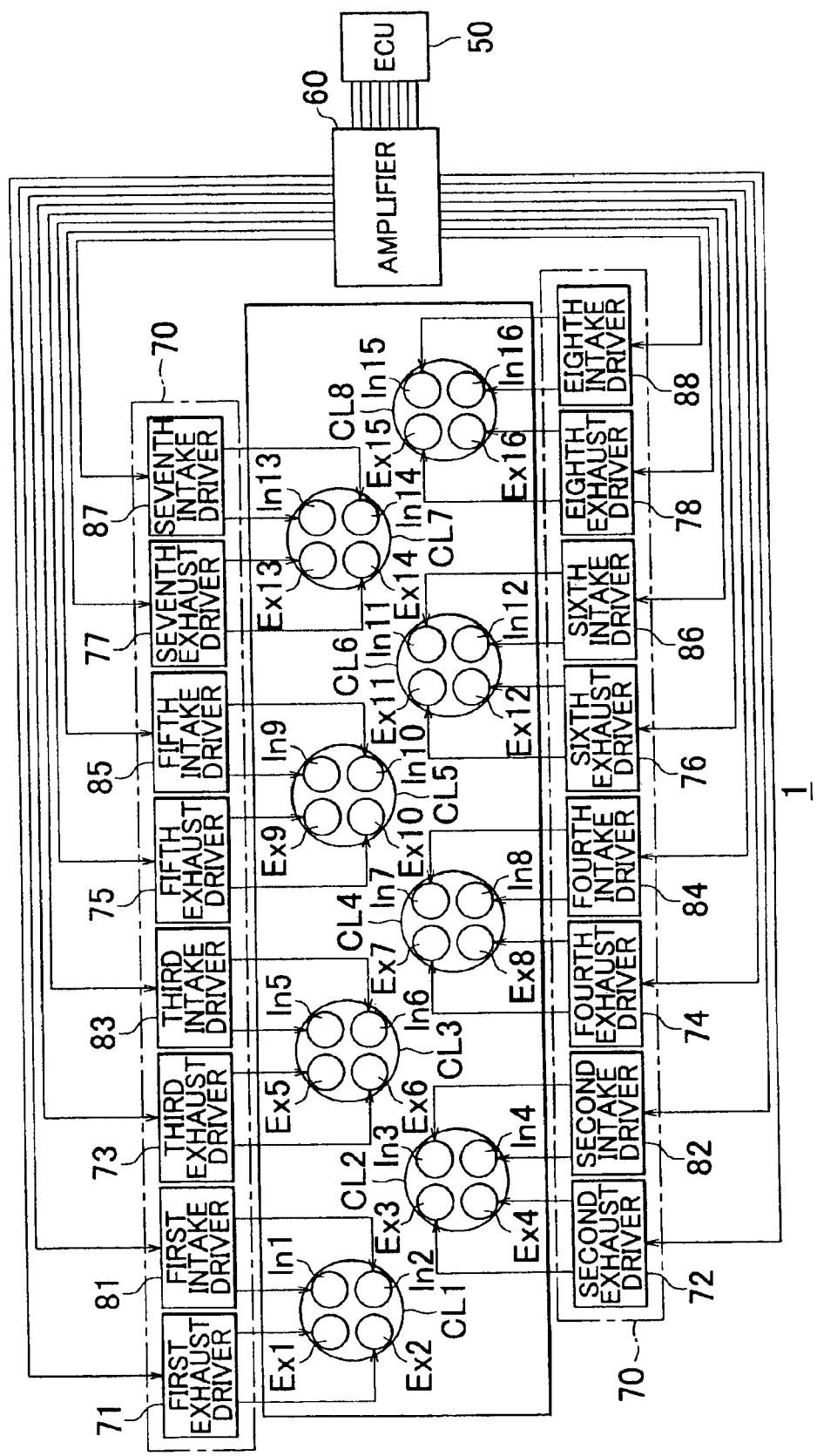
FIG. 16 is a diagram showing a configuration of a V-eight internal combustion engine according to a third embodiment of the invention.

In the third embodiment, the invention is applied to a V-8 internal combustion engine 1. FIG. 16 shows a configuration of the internal combustion engine 1 according to the embodiment. The internal combustion engine 1 is different from the internal combustion engine 1 in the second embodiment in that a seventh cylinder CL7 and an eighth cylinder CL8 are provided, and correspondingly, the valve driver 70 includes a seventh exhaust driver 77 and a seventh intake driver 87, and an eighth exhaust driver 78 and an eighth intake driver 88.

Figure 17:
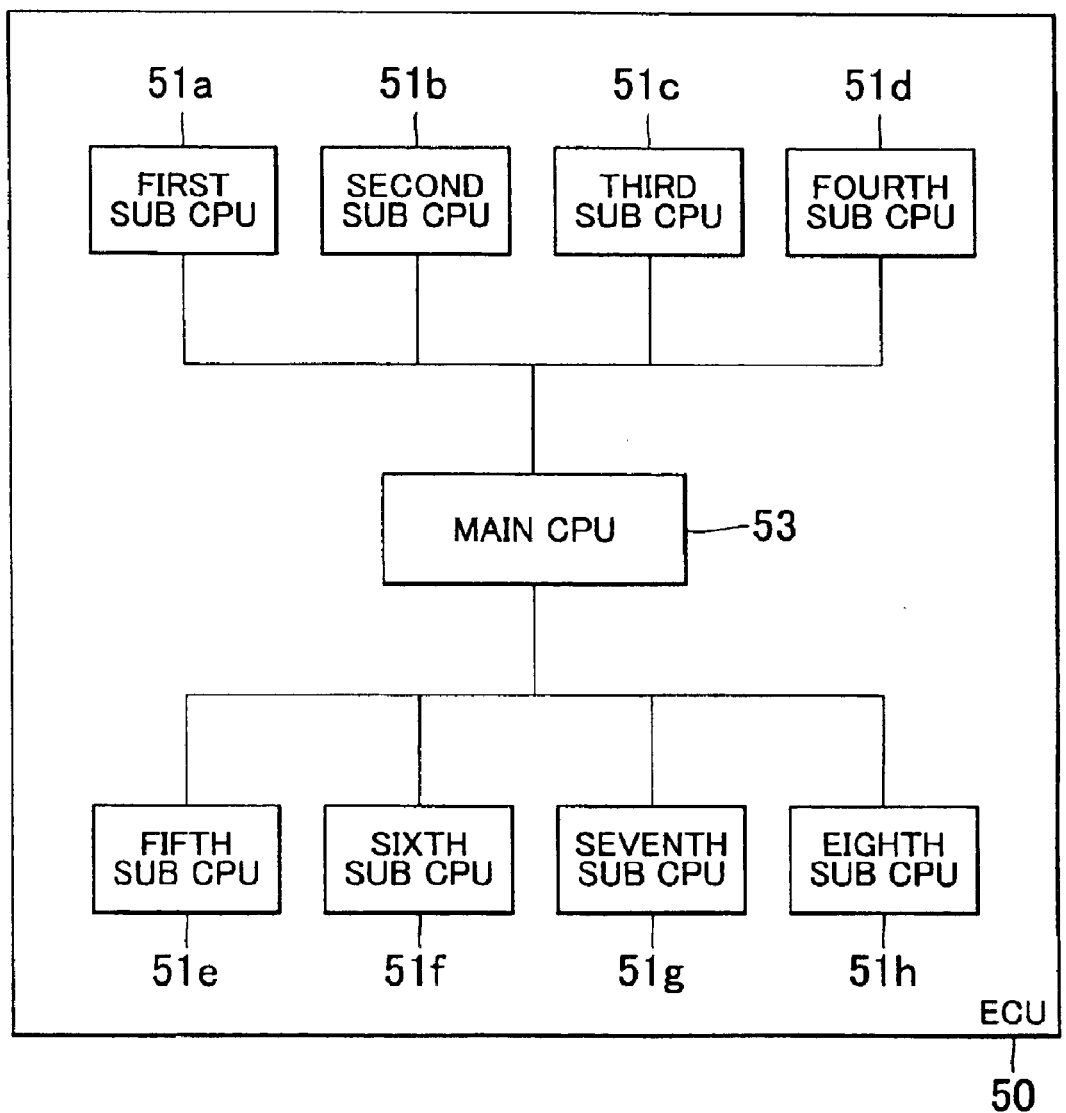
FIG. 17 is block diagram schematically showing a configuration of an ECU which controls electromagnetically driven valves according to the third embodiment of the invention.

FIG. 17 is a block diagram schematically showing a configuration of the ECU 50 which controls the electromagnetically driven valves 200 according to the embodiment. The first sub CPU 51*a* controls the first intake valve In1 and the second intake valve In2 in the first cylinder CL1, and the eleventh intake valve In11 and the twelfth intake valve In12 in the sixth cylinder CL6. The second sub CPU 51*b* controls the third intake valve In3 and the fourth intake valve In4 in the second cylinder CL2, and the fifth intake valve In5 and the sixth intake valve In6 in the third cylinder CL3. The third sub CPU 51*c* controls the seventh intake valve In7 and the eighth intake valve In8 in the fourth cylinder CL4, and the thirteenth intake valve In 13 and a fourteenth intake valve In14 in the seventh cylinder CL7. The fourth sub CPU 51*d* controls the ninth intake valve In9 and the tenth intake valve In10 in the fifth cylinder CL5, and a fifteenth intake valve In5 and a sixteenth intake valve In16 in the eighth cylinder CL8.

Meanwhile, the fifth sub CPU 51*e* controls the first exhaust valve Ex1 and the second exhaust valve Ex2 in the first cylinder CL1, and the eleventh exhaust valve Ex11 and the twelfth exhaust valve Ex12 in the sixth cylinder CL6. The sixth sub CPU 51*f* controls the third exhaust valve Ex3 and the fourth exhaust valve Ex4 in the second cylinder CL2, and the fifth exhaust valve Ex5 and the sixth exhaust valve Ex6 in the third cylinder CL3. A seventh sub CPU 51*g* controls the seventh exhaust valve Ex7 and the eighth exhaust valve Ex8 in the fourth cylinder CL4, and a thirteenth exhaust valve Ex13 and a fourteenth exhaust valve Ex14 in the seventh cylinder CL7. An eighth sub CPU 51*h* controls the ninth exhaust valve Ex9 and the tenth exhaust valve Ex10 in the fifth cylinder CL5, and a fifteenth exhaust valve Ex15 and a sixteenth exhaust valve Ex16 in the eighth cylinder CL8.

Figure 18:
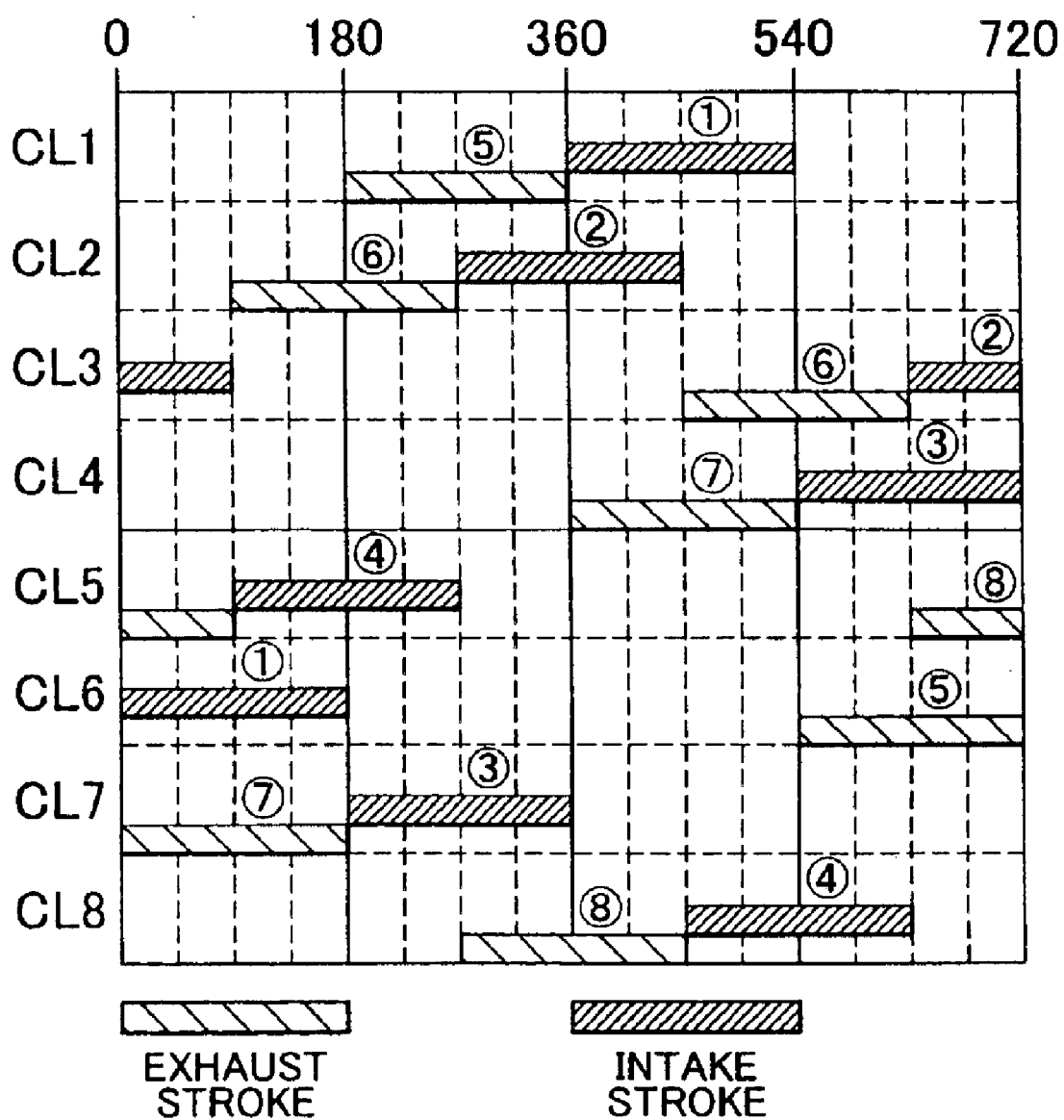
FIG. 18 is a diagram showing intake strokes and exhaust strokes of one cycle of the internal combustion engine according to the third embodiment of the invention.

FIG. 18 shows intake strokes and exhaust strokes of the internal combustion engine 1 when the eight sub CPUs 51 controls the intake valves In and the exhaust valves Ex in the V-8 internal combustion engine 1. Each of reference numerals 1 to 8 in circles indicates a number assigned to each sub CPU 51 which controls the electromagnetically driven valve 200 that is opened during each of the intake strokes and the exhaust strokes, as in FIG. 4, FIG. 10, FIG. 14, and FIG. 15. Ignition is performed in the order of the first cylinder CL1, the eighth cylinder CL8, the fourth cylinder CL4, the third cylinder CL3, the sixth cylinder CL6, the fifth cylinder CL5, the seventh cylinder CL7, and the second cylinder CL2. The phases of the cylinders are shifted from each other by 90 degrees in terms of crank angle. The exhaust timing phase of one of the two cylinders controlled by each sub CPU 51 is shifted from that of the other cylinder by 360 degrees in terms of crank angle. Similarly, the intake timing phase of one of the two cylinders controlled by each sub CPU 51 is shifted from that of the other cylinder by 360 degrees in terms of crank angle. For example, the opening periods of the intake valves In provided in the first cylinder CL1 and the sixth cylinder CL6 that are controlled by the first sub CPU 51*a* do not overlap with each other during the operation in the low speed low load region, as long as one valve driving is performed, in this case as well. In other words, the opening/closing operation periods of these intake valves do not overlap with each other. A procedure for switching between the low speed control and the high speed control is the same as that shown in the flowchart in FIG. 7 or FIG. 9.

When the opening periods of the intake valves In provided in different cylinders do not overlap with each other, and the opening periods of the exhaust valves Ex do not overlap with each other, the number of the sub CPU 51 may be four. In this case, the ECU 50 has the configuration shown in FIG. 3. However, the first sub CPU 51*a* controls the intake valves In in the first cylinder CL1, the fourth cylinder CL4, the sixth cylinder CL6, and the seventh cylinder CL7. The second sub CPU 51*b* controls the intake valves In in the second cylinder CL2, the third cylinder CL3, the fifth cylinder CL5, and the eighth cylinder CL8. Similarly, the third sub CPU 51*c* controls the exhaust valves Ex in the first cylinder CL1, the fourth cylinder CL4, the sixth cylinder CL6, and the seventh cylinder CL7. The fourth sub CPU 51*d* controls the exhaust valves Ex in the second cylinder CL2, the third cylinder CL3, the fifth cylinder CL5, and the eighth cylinder CL8. A procedure for switching between the low speed control and the high speed control is the same as that shown in the flowchart in FIG. 7 or FIG. 9.

According to the embodiment, when the ECU 50 controls the intake valves In or the exhaust valves Ex composed of the electromagnetically driven valves 200, the meticulous control can be performed while suppressing an increase in the processing power of the CPU constituting the ECU 50, that is, an increase in the number of the CPUs in most cases.

From another viewpoint, since one CPU controls plural electromagnetically driven valves, an increase in the number of the CPUs can be suppressed, and accordingly an increase in the cost can be suppressed. Further, when one CPU controls the opening/closing operations of two or more electromagnetically driven valves 200 simultaneously, the control cycle of the CPU is changed correspondingly.

Therefore, the electromagnetically driven valves 200 can be appropriately controlled. Also, when the one valve driving is performed during the operation in the low speed low load region, it is possible to prevent a reduction in electric power consumption, a reduction in abrasion of the electromagnetically driven valves 200, and asymmetric abrasion of the electromagnetically driven valves 200.

The embodiments of the invention have been described. However, these embodiments are to be considered in all respects as illustrative and not restrictive, and it is apparent to those skilled in the art that various modifications can be made to combinations of the components or the processes, and such modified examples are also in the scope of the invention.

According to the embodiments, the electromagnetically driven valves can be appropriately controlled without increasing the number of the processing units which control the electromagnetically driven valves. Also, from another viewpoint, the electromagnetically driven valves can be performed such that the operation noise is reduced.

What is claimed is:

1. An electromagnetically driven valve control apparatus for a multi-cylinder internal combustion engine, comprising:
   electromagnetically driven valves, each of which is at least one of an intake valve and an exhaust valve that are provided in each of cylinders of the internal combustion engine, and each of which is driven using electromagnetic force; and
   a controller provided with processing units, each of which controls the electromagnetically driven valves in each of plural valve groups, each of the plural valve groups including the electromagnetically driven valves whose opening periods do not overlap with each other while the internal combustion engine is operated in a low speed low load region, wherein the electromagnetically driven valves provided in the cylinders are divided into the plural valve groups such that each of the plural valve groups includes the electromagnetically driven valves in different cylinders, whose opening periods do not overlap with each other while the internal combustion engine is operated in the low speed low load region, and wherein a control cycle of each of the processing units when the electromagnetically driven valves are operated to be opened/closed can be changed based on whether or not opening/closing operations of the plural electromagnetically driven valves in each of the valve groups overlap with each other.

2. The electromagnetically driven valve control apparatus according to claim 1, wherein the control cycle is shortened when the opening/closing operations of the plural electromagnetically driven valves in each of the valve groups overlap with each other.

3. The electromagnetically driven valve control apparatus according to claim 1, wherein plural intake valves are provided in each of the cylinders, the electromagnetically driven valves are divided into the plural valve groups such that each of the plural valve groups includes the plural electromagnetically driven valves constituting the plural intake valves in each of the cylinders, and only one valve of the plural intake valves in each of the cylinders is operated to be opened/closed while the internal combustion engine is operated in the low speed low load region.

4. The electromagnetically driven valve control apparatus according to claim 3, wherein a control cycle of each of the processing units when the electromagnetically driven valves are operated to be opened/closed can be changed based on whether or not only one valve of the plural intake valves in each of the cylinders is operated.

5. The electromagnetically driven valve control apparatus according to claim 4, wherein the control cycle is shortened when the only one valve of the plural intake valves in each of the cylinders is operated.

6. The electromagnetically driven valve control apparatus according to claim 1, wherein plural exhaust valves are provided in each of the cylinders, the electromagnetically driven valves are divided into the plural valve groups such that each of the plural valve groups includes the plural electromagnetically driven valves constituting the plural exhaust valves in each of the cylinders, and only one valve of the plural exhaust valves in each of the cylinders is operated to be opened/closed while the internal combustion engine is operated in the low speed low load region.

7. The electromagnetically driven valve control apparatus according to claim 6, wherein a control cycle of each of the processing units when the electromagnetically driven valves are operated to be opened/closed can be changed based on whether or not only one valve of the plural exhaust valves in each of the cylinders is operated.

8. The electromagnetically driven valve control apparatus according to claim 7, wherein the control cycle is shortened when the only one valve of the plural exhaust valves in each of the cylinders is operated.

9. An electromagnetically driven valve control apparatus for a multi-cylinder internal combustion engine, comprising:
   electromagnetically driven valves, each of which is at least one of an intake valve and an exhaust valve that are provided in each of cylinders of the internal combustion engine, and each of which is driven using electromagnetic force; and
   a controller provided with processing units, each of which controls the electromagnetically driven valves in each of plural valve groups, each of the plural valve groups including the electromagnetically driven valves whose opening periods do not overlap with each other while the internal combustion engine is operated in a low speed low load region, wherein each of the plural valve groups includes the electromagnetically driven valves of cylinders in which an intake timing and an exhaust timing are shifted each other by 360 degrees in terms of a crank angle.

10. An electromagnetically driven valve control apparatus for a multi-cylinder internal combustion engine, comprising:
    electromagnetically driven valves, each of which is at least one of an intake valve and an exhaust valve that are provided in each of cylinders of the internal combustion engine, and each of which is driven using electromagnetic force; and
    a controller provided with processing units, each of which controls the electromagnetically driven valves in each of plural valve groups, each of the plural valve groups including the electromagnetically driven valves whose opening periods do not overlap with each other while the internal combustion engine is operated in a low speed low load region, wherein the multi-cylinder internal combustion engine is an in-line six-cylinder internal combustion engine, and each of the plural valve groups includes the electromagnetically driven valves of cylinders in
    which an intake timing and an exhaust timing are shifted each other by 240 degrees in terms of a crank angle.

11. An electromagnetically driven valve control method for a multi-cylinder internal combustion engine in which at least one of an intake valve and an exhaust valve that are provided in each of cylinders is configured as an electromagnetically driven valve that is driven using electromagnetic force, comprising the steps of:

dividing the electromagnetically driven valves into plural valve groups such that overlap of concentrated control periods for the electromagnetically driven valves in each of the valve groups is minimized;

controlling the electromagnetically driven valves in each of the valve groups using a single control body; and changing a control cycle of each of the processing units when the electromagnetically driven valves are operated to be opened/closed on the basis of whether or not opening/closing operations of the plural electromagnetically driven valves in each of the valve groups overlap with each other, wherein each of the plural valve groups includes the electromagnetically driven valves whose opening periods do not overlap with each other while the internal combustion engine is operated in a low speed low load region, the electromagnetically driven valves provided in the cylinders are divided into the plural valve groups such that each of the plural valve groups includes the electromagnetically driven valves in different cylinders, whose opening periods do not overlap with each other while the internal combustion engine is operated in the low speed low load region.

12. The electromagnetically driven valve control method according to claim 11, wherein plural intake valves are provided in each of the cylinders, the electromagnetically driven valves are divided into the plural valve groups such that each of the plural valve groups includes the plural electromagnetically driven valves constituting the plural intake valves in each of the cylinders, and only one valve of the plural intake valves in each of the cylinders is operated to be opened/closed while the internal combustion engine is operated in the low speed low load region.

13. The electromagnetically driven valve control method according to claim 12, further comprising the step of:

changing a control cycle of each of the processing units when the electromagnetically driven valves are operated to be opened/closed on the basis of whether or not only one valve of the plural intake valves in each of the cylinders is operated.

14. The electromagnetically driven valve control method according to claim 11, wherein plural exhaust valves are provided in each of the cylinders, the electromagnetically driven valves are divided into the plural valve groups such that each of the plural valve groups includes the plural electromagnetically driven valves constituting the plural exhaust valves in each of the cylinders, and only one valve of the plural exhaust valves in each of the cylinders is operated to be opened/closed while the internal combustion engine is operated in the low speed low load region.

15. The electromagnetically driven valve control method according to claim 14, further comprising the step of:

changing a control cycle of each of the processing units when the electromagnetically driven valves are operated to be opened/closed on the basis of whether or not only one valve of the plural exhaust valves in each of the cylinders is operated.

* * * * *

UNITED STATES PATENT AND TRADEMARK OFFICE
CERTIFICATE OF CORRECTION

PATENT NO.     : 6,866,012 B2
DATED          : March 15, 2005
INVENTOR(S)    : Yuichiro Hayase et al.

It is certified that error appears in the above-identified patent and that said Letters Patent is hereby corrected as shown below:

Column 9,
Line 53, change "60 (s" to -- 60$\mu$s --.
Line 55, change "30 (s." to -- 30$\mu$s --.

Signed and Sealed this

Eleventh Day of October, 2005

JON W. DUDAS
*Director of the United States Patent and Trademark Office*